(12) United States Patent
Guisan et al.

(10) Patent No.: US 12,517,197 B2
(45) Date of Patent: Jan. 6, 2026

(54) ANALOG MAGNETIC SENSOR DEVICE FOR MEASURING THE ORIENTATION OF AN EXTERNAL MAGNETIC FIELD

(71) Applicant: Allegro MicroSystems, LLC, Manchester, NH (US)

(72) Inventors: Santiago Serrano Guisan, San Jose, CA (US); Anuraag Mohan, Fremont, CA (US)

(73) Assignee: Allegro MicroSystems, LLC, Manchester, NH (US)

( * ) Notice: Subject to any disclaimer, the term of this patent is extended or adjusted under 35 U.S.C. 154(b) by 231 days.

(21) Appl. No.: 18/415,991

(22) Filed: Jan. 18, 2024

(65) Prior Publication Data

US 2025/0237719 A1     Jul. 24, 2025

(51) Int. Cl.
*G01V 3/00* (2006.01)
*G01R 33/00* (2006.01)
(Continued)

(52) U.S. Cl.
CPC ......... *G01R 33/24* (2013.01); *G01R 33/0029* (2013.01); *G01R 33/0041* (2013.01); *G01R 33/09* (2013.01)

(58) Field of Classification Search
CPC ................ G06T 11/005; G06T 11/006; G06T 2211/428; G01R 33/4818
(Continued)

(56) References Cited

U.S. PATENT DOCUMENTS 4,401,944 A    8/1983   Narimatsu et al.
4,926,121 A    5/1990   Guay
(Continued)

FOREIGN PATENT DOCUMENTS

CN    107036516 B  *  3/2020   ............ G01B 7/004
DE    37 26 260 A1    2/1989
(Continued)

OTHER PUBLICATIONS

PCT International Search Report and Written Opinion dated Apr. 2, 2025 for International Application No. PCT/US2024/059291; 14 Pages.
(Continued)

*Primary Examiner* — Walter L Lindsay, Jr.
*Assistant Examiner* — Frederick Wenderoth
(74) *Attorney, Agent, or Firm* — DALY, CROWLEY, MOFFORD & DURKEE, LLP

(57) ABSTRACT

A two-dimensional analog angular magnetic sensor device for measuring an orientation of an external magnetic field, comprising at least a magnetic sensor, comprising a plurality of tunnel magnetoresistance (TMR) elements arranged in a full-bridge configuration and configured to provide a sine output voltage: $V_{SIN}=A \cdot \sin\theta \cdot V_{dd}$, or configured to provide a cosine output voltage $V_{COS}=A \cdot \cos\theta \cdot V_{dd}$, wherein A is parameter depending on the TMR ratio of the TMR element and $V_{dd}$ is a bias voltage inputted to the magnetic sensor. The magnetic sensor device further comprises an analog circuit configured to generates a circuit output voltage and electrically connected to the magnetic sensor such as that the magnetic sensor device generates a device output voltage that follows one of: a tangent output voltage $V_{TAN}$: $V_{out}=K \cdot V_{dd} \cdot V_{TAN}=K \cdot V_{dd} \cdot \tan\theta$, where K is a constant; or a cotangent output voltage ($V_{COTAN}$):

$$V_{out} = K \cdot V_{dd} \cdot V_{COTAN} = K \cdot V_{dd} \cdot \cot\theta.$$

29 Claims, 22 Drawing Sheets

(51) Int. Cl.
*G01R 33/09* (2006.01)
*G01R 33/24* (2006.01)

(58) Field of Classification Search
USPC ........................................................ 324/301
See application file for complete search history.

(56) References Cited

U.S. PATENT DOCUMENTS

| | | |
|---|---|---|
| 4,951,300 A | 8/1990 | Koike |
| 5,004,981 A | 4/1991 | Hashimoto et al. |
| 5,444,369 A | 8/1995 | Luetzow |
| 5,650,721 A | 7/1997 | Van den Berg et al. |
| 5,880,586 A | 3/1999 | Dukart et al. |
| 6,166,535 A | 12/2000 | Irle et al. |
| 6,236,199 B1 | 5/2001 | Irle et al. |
| 6,288,533 B1 | 9/2001 | Haeberli et al. |
| 6,291,907 B1 | 9/2001 | Haigh et al. |
| 6,340,908 B1 | 1/2002 | Matuyama |
| 6,545,462 B2 | 4/2003 | Schott et al. |
| 6,573,710 B1 | 6/2003 | Santos et al. |
| 6,580,269 B2 | 6/2003 | Hiligsmann et al. |
| 6,724,184 B1 | 4/2004 | Marx et al. |
| 6,762,897 B1 | 7/2004 | Kabashima et al. |
| 6,806,702 B2 | 10/2004 | Lamb et al. |
| 6,956,366 B2 | 10/2005 | Butzmann |
| 6,969,988 B2 | 11/2005 | Kakuta et al. |
| 7,030,606 B2 | 4/2006 | Kato et al. |
| 7,119,538 B2 | 10/2006 | Blossfeld |
| 7,288,931 B2 | 10/2007 | Granig et al. |
| 7,323,870 B2 | 1/2008 | Tatschl et al. |
| 7,385,394 B2 | 6/2008 | Auburger et al. |
| 7,714,570 B2 | 5/2010 | Thomas et al. |
| 7,759,929 B2 | 7/2010 | Forsyth |
| 7,911,203 B2 | 3/2011 | Thomas et al. |
| 7,994,774 B2 | 8/2011 | Thomas et al. |
| 8,054,071 B2 | 11/2011 | Doogue et al. |
| 8,125,216 B2 | 2/2012 | Thomas et al. |
| 8,749,227 B2 | 6/2014 | Thomas et al. |
| 8,773,123 B2 | 7/2014 | Doogue et al. |
| 9,797,746 B2 | 10/2017 | Vuillermet et al. |
| 10,288,698 B2 | 5/2019 | Romero |
| 10,557,726 B2 | 2/2020 | Lassalle-Balier |
| 10,663,537 B2 | 5/2020 | Childress et al. |
| 11,162,815 B2 | 11/2021 | Sirohiwala et al. |
| 11,175,160 B2 | 11/2021 | Aguirre et al. |
| 11,307,017 B2 | 4/2022 | Romero |
| 11,333,530 B2 | 5/2022 | Foletto |
| 11,448,713 B1 | 9/2022 | Ostermann et al. |
| 11,473,935 B1 | 10/2022 | Diaconu et al. |
| 11,604,058 B2 | 3/2023 | Lassalle-Balier et al. |
| 11,860,250 B2 | 1/2024 | Timopheev |
| 11,946,985 B2 | 4/2024 | Timopheev et al. |
| 2002/0021124 A1 | 2/2002 | Schott et al. |
| 2002/0167306 A1 | 11/2002 | Zalunardo et al. |
| 2002/0171418 A1 | 11/2002 | Hinz et al. |
| 2005/0127899 A1 | 6/2005 | Kakuta et al. |
| 2005/0275399 A1 | 12/2005 | Kitanaka et al. |
| 2006/0208727 A1 | 9/2006 | Matsumoto et al. |
| 2007/0029998 A1 | 2/2007 | Popovic et al. |
| 2007/0296411 A1 | 12/2007 | Thomas et al. |
| 2009/0140725 A1 | 6/2009 | Ausserlechner |
| 2009/0174395 A1 | 7/2009 | Thomas et al. |
| 2009/0224754 A1 | 9/2009 | Lamarre et al. |
| 2010/0156397 A1 | 6/2010 | Yabusaki et al. |
| 2010/0181997 A1 | 7/2010 | Thomas et al. |
| 2010/0201356 A1 | 8/2010 | Koller et al. |
| 2010/0276769 A1 | 11/2010 | Theuss et al. |
| 2010/0295140 A1 | 11/2010 | Theuss et al. |
| 2011/0121825 A1 | 5/2011 | Thomas et al. |
| 2011/0121826 A1 | 5/2011 | Engel et al. |
| 2017/0212189 A1 | 7/2017 | Holm et al. |
| 2021/0223023 A1 | 7/2021 | Romero |
| 2022/0404442 A1 | 12/2022 | Fujiura et al. |
| 2023/0037545 A1 | 2/2023 | Ali et al. |

FOREIGN PATENT DOCUMENTS

| | | |
|---|---|---|
| DE | 40 18 839 A1 | 12/1991 |
| DE | 195 48 385 A1 | 7/1997 |
| DE | 199 20 596 A1 | 11/2000 |
| DE | 100 41 089 A1 | 3/2002 |
| DE | 101 16 240 A1 | 10/2002 |
| EP | 0 368 687 A2 | 5/1990 |
| EP | 0 916 074 B1 | 5/1999 |
| EP | 1 882 907 A1 | 1/2008 |
| EP | 2 000 813 A1 | 12/2008 |
| EP | 2 000 814 A2 | 12/2008 |
| JP | 2000-304570 A | 11/2000 |
| JP | 2003-009565 A | 1/2003 |
| JP | 2003-042709 | 2/2003 |
| JP | 2005-241269 | 9/2005 |
| JP | 2006-208049 A | 8/2006 |
| JP | 2010-014607 A | 1/2010 |
| JP | 2010-042709 A | 2/2010 |
| JP | 2010-078366 A | 4/2010 |
| JP | 2012-127783 A | 7/2012 |
| WO | WO 00/02266 | 1/2000 |
| WO | WO 2004/113928 A2 | 12/2004 |
| WO | WO 2008/020817 A1 | 2/2008 |
| WO | WO-2021001738 A1 * | 1/2021 ........... G01R 33/098 |

OTHER PUBLICATIONS

Heiliger et al., "Unusual Angular Dependence of Tunneling Magneto-Seebeck Effect;" Research Article from AIP Advances, vol. 8, Issue 11; Nov. 7, 2018; 4 Pages.

Slonczewski, "Conductance and Exchange Coupling of Two Ferromagnets Separated by a Tunneling Barrier;" Article in Physical Review B, vol. 39, No. 10; Apr. 1, 1989; 8 Pages.

U.S. Appl. No. 18/161,145, filed Jan. 30, 2023, Jaiswal et al.

Austriamicrosystems, "10-Bit 360 Programmable Magnetic Rotary Encoder," AS5040 Data Sheet, Oct. 25, 2005, Austriamicrosystems AG, Schloss Premstatten, Austria; 28 Pages.

Austriamicrosystems, "10 Bit Programmable Magnetic Rotary Encoder," AS5040 Data Sheet, Copyright 2004, 20 Pages.

Austriamicrosystems, "10 Bit Programmable 360 Magnetic Angle Encoder with Absolute Digital and Analog Outputs," AS5043 Fact Sheet, Apr. 11, 2005, Austriamicrosystems AG, Schloss Premstatten, Austria; 1 Page.

Austriamicrosystems, "Programmable 360 Magnetic Angle Encoder with Absolute SSI and Analog Outputs," AS5043 Preliminary Data Sheet, Oct. 3, 2006, Austriamicrosystems AG, Schloss Premstatten, Austria; 26 Pages.

Austriamicrosystems, "8 Bit (64 PPR) Incremental Magnetic Rotary Encoder," AS5035 Fact Sheet, Oct. 24, 2005, Austriamicrosystems AG, Schloss Premstatten, Austria; 1 Page.

Austriamicrosystems, "Programmable 64 PPR Incremental Magnetic Rotary Encoder," AS5035 Data Sheet, Oct. 3, 2006, Austriamicrosystems AG, Schloss Premstatten, Austria; 17 Pages.

Austriamicrosystems, "12 Bit Programmable Magnetic Rotary Encoder," AS5045 Fact Sheet, Oct. 11, 2005, Austriamicrosystems AG, Schloss Premstatten, Austria; 1 Page.

Austriamicrosystems, "12 Bit Programmable Magnetic Rotary Encoder," AS5045 Data Sheet, Oct. 3, 2006, Austriamicrosystems AG, Schloss Premstatten, Austria; 23 Pages.

Drljaca et al., "Nonlinear Effects In Magnetic Angular Position Sensor With Integrated Flux Concentrator", Proc. $23^{rd}$ International Conference on Microelectronics (Miel 2002), vol. 1, Nis, Yugoslavia, May 12-15, 2002, 4 pages.

Haberli et al., "Two-Dimensional Magnetic Microsensor With On-Chip Signal Processing For Contactless Angle Measurement", IEEE Journal of Solid-State Circuits, vol. 31, No. 12, Dec. 1996, pp. 1902-1907; 6 Pages.

Haberli et al., "Contactless Angle Measurement By CMOS Magnetic Sensor With On-Chip Read-Out Circuit" in Proc. Transducers '95, Jun. 1995, vol. 2, pp. 134-137; 4 Pages.

IC Haus, iC-MA, Angular Hall Sensor/Encoder, 2005, pp. 1-17, iC-Haus GmbH, D-55294 Bodenheim, Germany; 17 Pages.

(56) References Cited

OTHER PUBLICATIONS

Kejik et al., "Circular Hall Transducer For Angular Position Sensing", 2007, IEEE, pp. 2593-2596; 4 Pages.
Law, "Angular Position Sensing with 2-Axis Hall ICs", Sensors, Mar. 2003, pp. 35-43; 6 Pages.
Melexis Microelectronic Integrated Systems, "Rotary Position Sensor IC;" MLX 90316; Sep. 20, 2005, 34 Pages.

* cited by examiner

ANALOG MAGNETIC SENSOR DEVICE FOR MEASURING THE ORIENTATION OF AN EXTERNAL MAGNETIC FIELD

FIELD

The present disclosure concerns a magnetic sensor configured to measure the variation of an external magnetic field orientation. The present disclosure further concerns a magnetic sensor configured to generate an output voltage that is linear with respect to the orientation of the external magnetic field and having a minimal dependence on temperature.

BACKGROUND

Magnetic sensors have many consumer, industrial and automotive applications. Current sensing, positioning, proximity detection, biometric sensing are some examples. Sensor technologies using a magnetic tunnel junctions (MTJ) based on tunnel magnetoresistance (TMR) effect excel among rival technologies based on anisotropic magnetoresistance (AMR) effect, giant magnetoresistance (GMR) effect and Hall effect, thanks to their higher sensitivity and signal-to-noise ratio (SNR), lower temperature dependence, better long-term stability and generally smaller die size.

A magnetic sensor can either show unidirectional sensitivity (so called 1D magnetic sensor) or bidirectional sensitivity (so called 2D magnetic sensor or angular magnetic sensor) relative to an external magnetic field. Ideally a 1D magnetic sensor should output a linear magnetic response, whether an angular magnetic sensor should output a sinusoidal response with respect to the orientation of the external magnetic field.

A TMR-based magnetic sensor typically comprises a plurality of magnetic tunnel junction (MTJs) elements. Each MTJ element 20 typically comprises (see FIG. 1) a tunnel barrier layer 22 sandwiched between a ferromagnetic reference layer 21 and a ferromagnetic sense layer 23. The reference layer 21 has a fixed reference magnetization 210. The sense layer 23 has a sense magnetization 230 that can be oriented along the direction of the external magnetic field 60. Due to the TMR effect, the resistance of an MTJ element 20 depends on the relative orientation j between sense layer magnetization 230 and reference layer magnetization 210:

$$R(\varphi) = \frac{1}{G(\varphi)} = \frac{1}{G_0 + (\Delta G/2) \cdot \cos\varphi}, \quad \text{Eq. 1a}$$

where G is the conductivity, $\Box G$ is the change of conductivity due to the TMR effect, $G_0$ is the average conductivity between parallel and antiparallel configuration of the MTJ element. However, because the relative orientation j between sense layer magnetization 230 and reference layer magnetization 210 can be written in terms of the orientation q of the external magnetic field 60, and the orientation a of the reference layer with respect to the x-axis coordinate:

$$\varphi = \theta - \alpha. \quad \text{Eq. 1b}$$

Equation 1a can then be re-written as:

$$R(\theta) = \frac{1}{G_0 + (\Delta G/2) \cdot \cos(\theta - \alpha)}. \quad \text{Eq. 1c}$$

In most cases, however, the orientation of the reference layer is along a pre-defined x-axis coordinate, which implies that a=0 and q=j and therefore:

$$R(\theta) = \frac{1}{G_0 + (\Delta G/2) \cdot \cos(\theta)}. \quad \text{Eq. 1d}$$

Note that equations 1a, 1c or 1d imply that, generally, the resistance of such TMR elements does not follow a cosine response. Only for TMR elements with small TMR ratio the resistance of such TMR elements will show a cosine response. Therefore, for the sake of clarity the response of such TMR elements (and characterized by equations 1a, 1c or 1d) will be described as a "pseudo-cosine" response.

Thus, a variation in the orientation of the external magnetic field 60 can be determined by passing a current through the MTJ element 20 and measuring a voltage.

A magnetic sensing element 2 can comprise a plurality of MTJ elements 20 arranged in a Wheatstone bridge circuit (see FIG. 2A) (also commonly called full bridge circuit). Each branch of the Wheatstone bridge 2 comprises one or a plurality of MTJ elements 20 connected in series and/or parallel. The output voltage generated from this Wheatstone bridge can be described as:

$$V_{out} = \left( \frac{R_2(\theta)}{R_1(\theta) + R_2(\theta)} - \frac{R_4(\theta)}{R_3(\theta) + R_4(\theta)} \right) \cdot V_{dd} \quad \text{Eq. 1e}$$

or:

$$V_{out} = \left( \frac{R_2(\theta) \cdot R_3(\theta) - R_1(\theta) \cdot R_4(\theta)}{[R_1(\theta) + R_2(\theta)] \cdot [R_3(\theta) + R_4(\theta)]} \right) \cdot V_{dd}, \quad \text{Eq. 1f}$$

where $R_1$, $R_2$, $R_3$ and $R_4$ are the resistances of each branch of the Wheatstone bridge 2 and $V_{dd}$ is the applied bias voltage.

Typically, the reference magnetization 210 can have a first orientation for two diagonal branches (for example branches $R_1$ and $R_4$) and a second orientation opposed to the first orientation for the two other diagonal branches (for example branches $R_2$ and $R_3$). For this configuration, the magnetic sensing element 2 generates an output voltage $V_{OUT}$ that is proportional to a sinusoidal signal with respect to the orientation of the external magnetic field 60:

$$V_{out} = \left( \frac{\Delta G}{2 \cdot G_0} \right) \cdot \cos\theta \cdot V_{dd} = \left( \frac{TMR}{TMR + 2} \right) \cdot \cos\theta \cdot V_{dd}. \quad \text{Eq. 1g}$$

There is an advantage in using a full bridge TMR based sensor circuit (as described in FIG. 2A) as a magnetic sensor device 2 to measure the orientation of the magnetic field instead of using a single TMR element. Unlike a TMR single element, a full bridge TMR based sensor circuit generates an output voltage $V_{OUT}$ that is fully proportional to a cosine signal (equations 1g).

An angular magnetic sensor can therefore comprise two full bridge magnetic sensing elements 2 in order to ensure an unambiguous determination of the orientation of the external magnetic field 60. The angular magnetic sensor can then generate sine output voltage $V_{SIN}$ following a sine signal and a cosine output voltage $V_{COS}$ following a cosine signal (see FIG. 2B). The cosine output voltage $V_{COS}$ and the sine output voltage $V_{SIN}$ can be described by equations 2a and 2b, respectively:

$$V_{cos} = A \cdot \cos\theta \cdot V_{dd}, \text{ and} \qquad \text{Eq. 2a}$$

$$V_{SIN} = A \cdot \sin\theta \cdot V_{dd}. \qquad \text{Eq. 2b}$$

where A is the amplitude of the output voltage signal $V_{SIN}$, $V_{COS}$ and $V_{dd}$ is the bias voltage applied to the magnetic sensing element 2. The orientation θ of the external magnetic field 60 is then determined by the arc tangent of the ratio between the sine output voltage $V_{SIN}$ and the cosine output voltage $V_{COS}$:

$$\theta = \arctan(V_{SIN}/V_{cos}). \qquad \text{Eq. 3a}$$

The determination of the orientation of the external magnetic field 60 requires the use of analog-digital-converters (ADC), microcontrollers (MCU) and/or the implementation of different iterative algorithm schemes (such as CORDIC schemes, for instance), impacting on the response speed and/or power consumption of the angular magnetic sensor. In order to increase the response speed, extensive CMOS design with very fast internal clocks can be used. However, this leads to a large die size.

Known angular magnetic sensors allow for fast determination of the orientation of the external magnetic field only for small angle ranges (θ≤±10°). For small angles, the sine output voltage $V_{SIN}$ is mostly proportional to the orientation θ:

$$V_{SIN} = A \cdot \sin\theta \cdot V_{dd} \sim A \cdot \left(\frac{\pi}{180}\right) \cdot \theta \cdot V_{dd}. \qquad \text{Eq. 4}$$

The amplitude A is dependent on temperature (typically up to 3000 ppm/° C.). The temperature dependence prevents an accurate determination of the external magnetic field orientation θ. The temperature dependence can be compensated by using a temperature correction scheme, however most known correction schemes do not allow for fully removing the temperature dependence.

SUMMARY

The present disclosure concerns a two-dimensional analog angular magnetic sensor device for measuring an orientation of an external magnetic field, comprising: at least a magnetic sensor, comprising a plurality of TMR elements arranged in a full-bridge configuration and configured to provide a sine output voltage:

$$V_{SIN} = A \cdot \sin\theta \cdot V_{dd},$$

or
configured to provide a cosine output voltage ($V_{COS}$):

$$V_{COS} = A \cdot \cos\theta \cdot V_{dd},$$

wherein A is parameter depending on the TMR ratio of the TMR element and $V_{dd}$ is a bias voltage inputted to the magnetic sensor. The magnetic sensor device further comprises an analog circuit configured to generates a circuit output voltage and electrically connected to the magnetic sensor such as that the magnetic sensor device generates a device output voltage that follows one of:

a tangent output voltage ($V_{TAN}$):

$$V_{out} = K \cdot V_{TAN} = K \cdot \tan\theta,$$

where K is a constant; or
a cotangent output voltage ($V_{COTAN}$):

$$V_{out} = K \cdot V_{COTAN} = K \cdot \cotan\theta.$$

With respect to what is known in the art, the present disclosure further concerns a magnetic sensor device comprising an analog circuit configured to provide a temperature stable quasi-linear output voltage for an angle range ≤180°. Furthermore, the magnetic sensor device has a small footprint and is potentially fast.

BRIEF DESCRIPTION

Exemplar embodiments of the invention are disclosed in the description and illustrated by the drawings in which.

DETAILED DESCRIPTION

Figure 1:
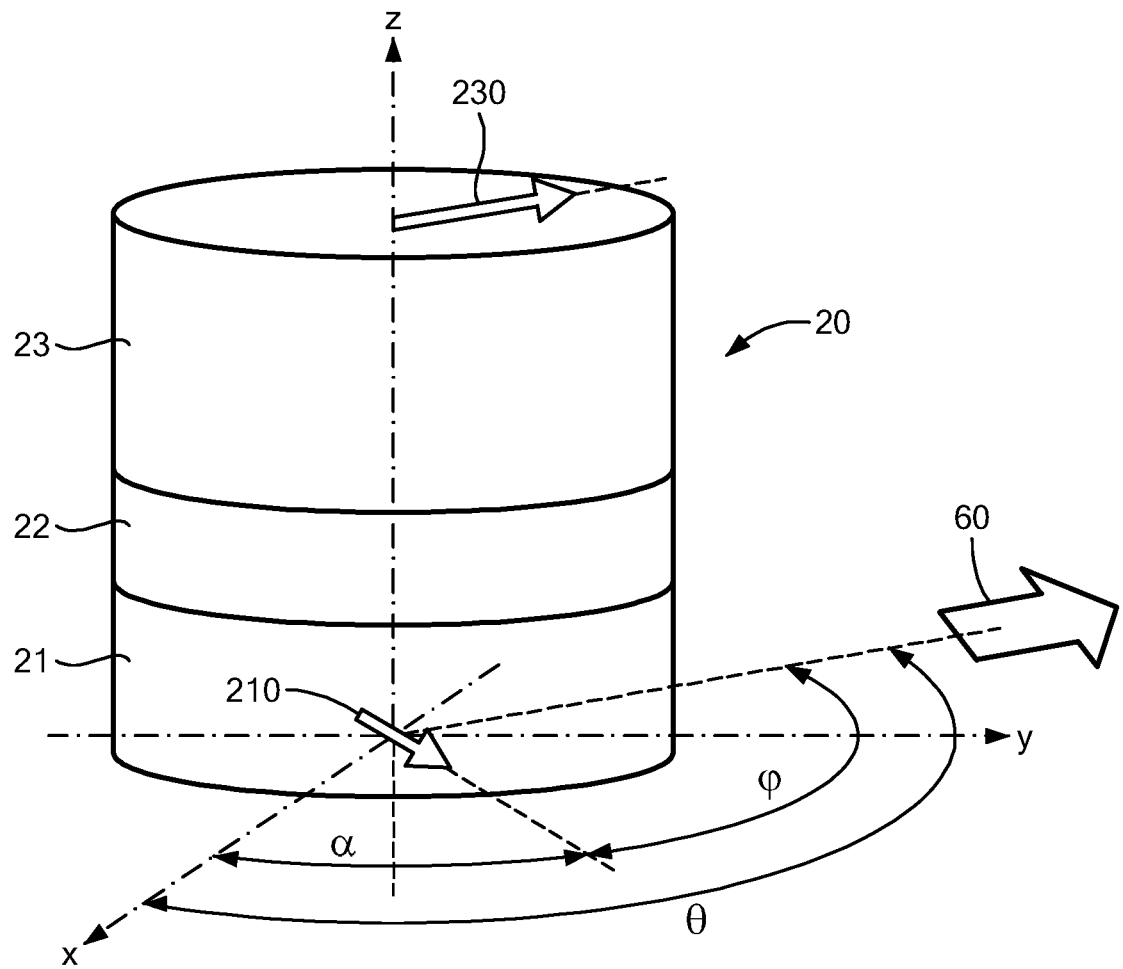
FIG. 1 illustrates schematically a magnetic tunnel junction (MTJ)
Figure 2A:
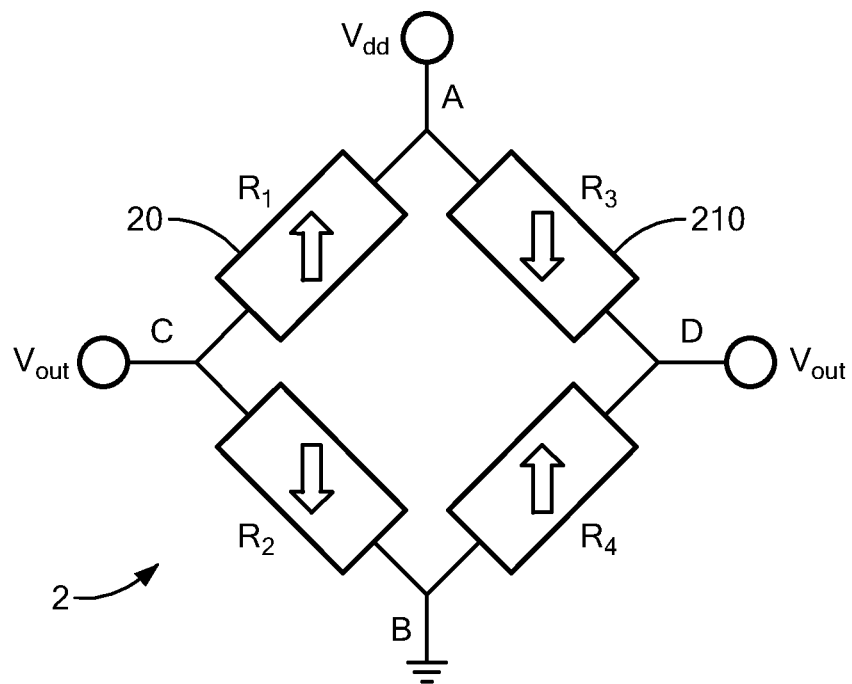
FIG. 2A illustrates a plurality of MTJ elements arranged in a Wheatstone bridge circuit.
Figure 2B:
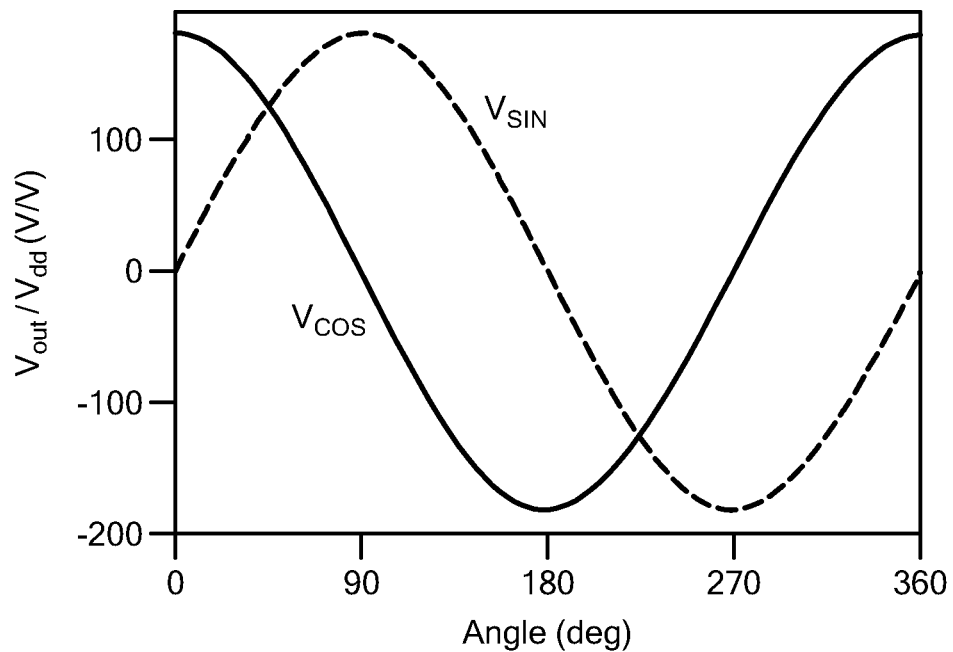
FIG. 2B show a sine output voltage and a cosine output voltage.
Figure 3A:
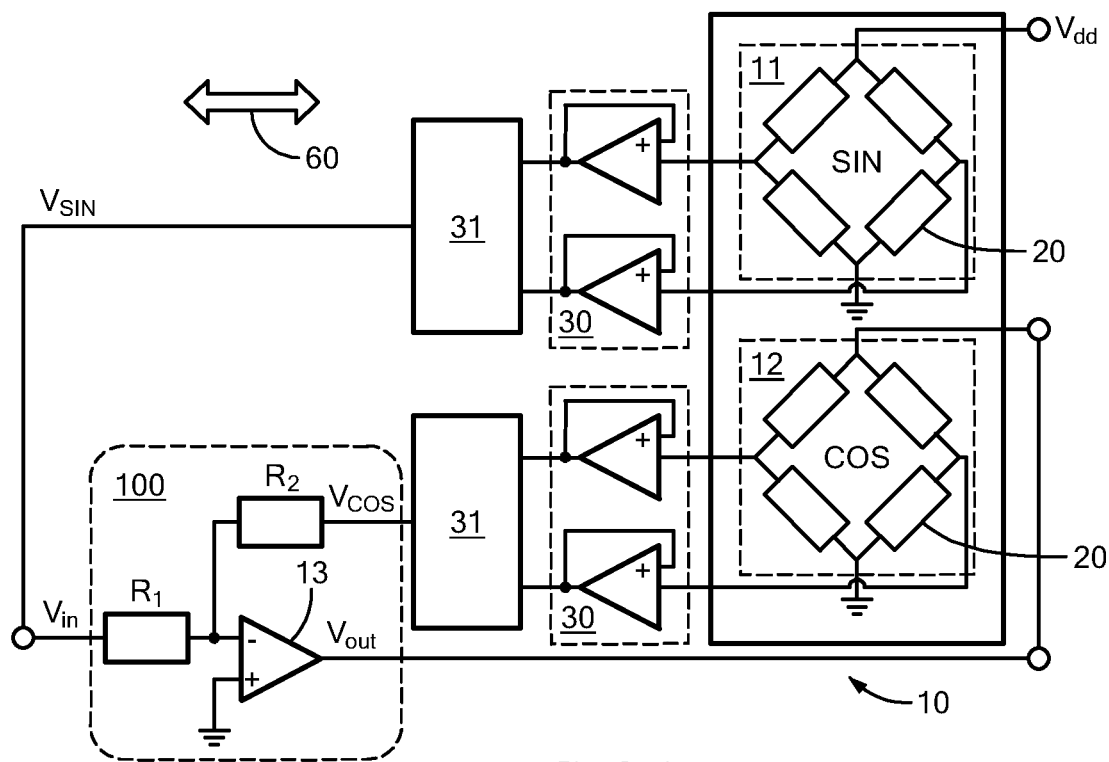
FIG. 3A shows an analog angular magnetic sensor device, according to an embodiment.

With reference to FIG. 3A, an analog angular magnetic sensor device (thereafter called "magnetic sensor device") 10 destined to measure an orientation of an external magnetic field 60, comprises a sine magnetic sensor 11 and a cosine magnetic sensor 12. In one aspect, the sine and cosine magnetic sensors 11, 12 are full bridge magnetic sensors. In other words, each of the sine and cosine magnetic sensors 11, 12 comprises a plurality of MTJ elements 20 arranged in a full bridge circuit, such as a Wheatstone bridge circuit. For example, the plurality of MTJ elements 20 can be arranged in a full bridge circuit as shown in FIG. 2A. Each MTJ element 20 can comprise tunnel barrier layer 22 sandwiched between a ferromagnetic reference layer 21 and a ferromagnetic sense layer 23 (see FIG. 1). The reference layer 21 has a fixed reference magnetization 210. The sense layer 23 has a sense magnetization 230 that can be oriented in an external magnetic field 60.

In one aspect, a bias voltage $V_{dd}$ is applied between the bias input (see for example the nodes A and B, see FIG. 2A) and a differential output voltage is generated between the differential output (see for example the nodes C and D, see FIG. 2A), of the sine and cosine full-bridge magnetic sensors 11, 12. In one aspect, the reference magnetization 210 can have a first orientation for two diagonal branches and a second orientation opposed to the first orientation for the two other diagonal branches. In the case, the reference magnetization 210 in the sine magnetic sensor 11 is oriented orthogonally with respect to the cosine magnetic sensor 12.

In an embodiment, the sine magnetic sensor 11 is configured to generate a differential output voltage that is a sine output voltage $V_{SIN}$ when biased by a constant voltage $V_{dd}$ (as described by Eq. 2b) following a sine function with respect to the external magnetic field orientation. The cosine magnetic sensor 12 is configured to generate a differential output voltage that is a cosine output voltage $V_{COS}$ when biased by a constant voltage $V_{dd}$ (as described by Eq. 2a) following a cosine function with respect to the external magnetic field orientation.

In an embodiment, the magnetic sensor device 10 comprises an analog circuit 100 configured to generates a circuit output voltage $V_{out\_ac}$ and electrically connected to the sine and cosine magnetic sensors 11, 12. The analog circuit 100 can include an inverting operational amplifier (op-amp) 13. In the configuration shown in FIG. 3A, the analog circuit 100 further includes a first resistance $R_1$ and a second resistance $R_2$. The input bias of the sine magnetic sensor 11 is connected to a bias voltage $V_{dd}$ and the sine output voltage $V_{SIN}$ of the sine magnetic sensor 11 is electrically connected to an inverting terminal of the inverting op-amp 13 via the first resistance $R_1$. The cosine output voltage $V_{COS}$ of the cosine magnetic sensor 12 is electrically connected to the inverting terminal of the inverting op-amp 13 through the second resistance $R_2$.

In configuration of FIG. 3A, the device output voltage $V_{out}$ of the magnetic sensor device 10 is used as the applied bias voltage to the cosine magnetic sensor 12. The input bias of the cosine magnetic sensor 12 is electrically connected to the output terminal of the inverting op-amp 13, forming a feedback loop of the inverting op-amp 13. The non-inverting terminal of the inverting op-amp 13 is connected to ground. In this configuration, the device output voltage $V_{out}$ of the magnetic sensor device 10 follows a tangent output voltage $V_{TAN}$. In other words, the output voltage of the op-amp output terminal corresponds to the device output voltage $V_{out}$ that can be expressed by equation 5a:

$$V_{out} = K \cdot V_{dd} \cdot V_{TAN} = K \cdot V_{dd} \cdot \tan\theta, \qquad \text{Eq. 5a}$$

where K is a constant.

In a variant of the magnetic sensor device configuration of FIG. 3A, the cosine output voltage $V_{COS}$ of the cosine magnetic sensor 12 is electrically connected to the inverting terminal of the op-amp 13 while the sine output voltage $V_{SIN}$ of the sine magnetic sensor 11 is electrically connected to the non-inverting terminal of the op-amp 13.

Figure 3B:
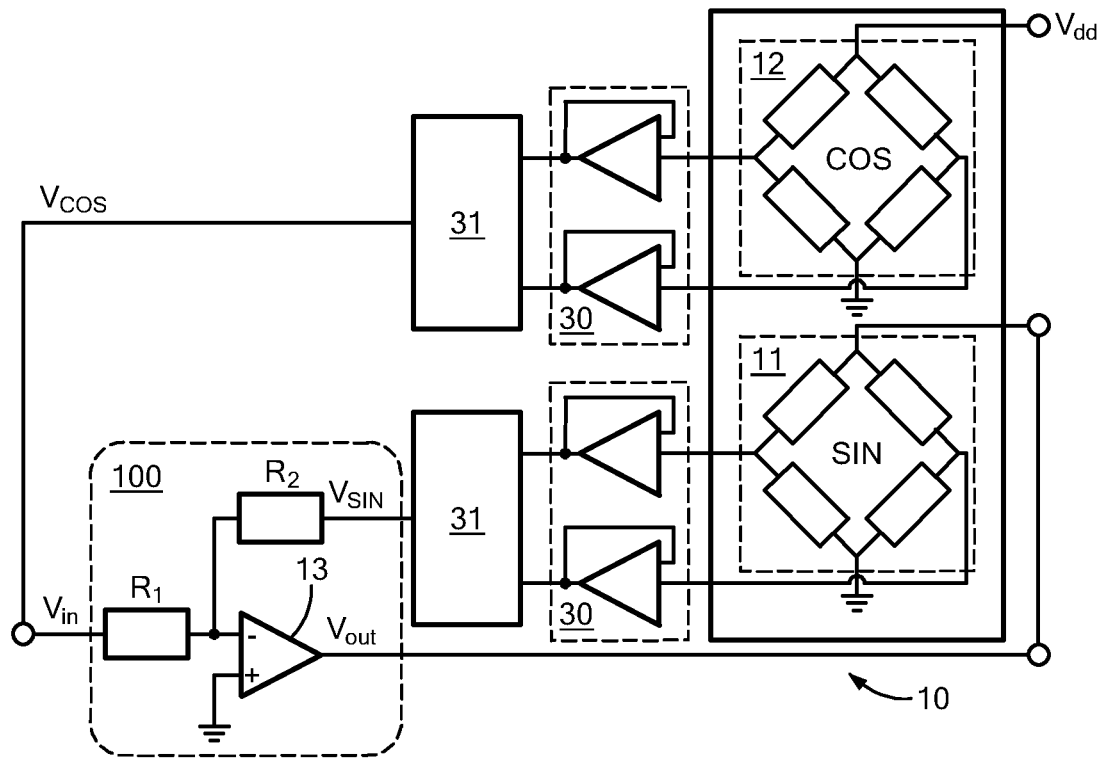
FIG. 3B illustrates a variant of the analog angular magnetic sensor device of FIG. 3A.

FIG. 3B illustrates a variant of the analog angular magnetic sensor device 10 of FIG. 3A, where the positions of the sine magnetic sensor 11 and of the cosine magnetic sensor 12 are inverted. In this configuration, the input bias of the cosine magnetic sensor 12 is connected to a bias voltage $V_{dd}$ and the cosine output voltage $V_{COS}$ is electrically connected to an inverting terminal of the inverting op-amp 13 via the first resistance $R_1$. The sine output voltage $V_{SIN}$ of the sine magnetic sensor 11 is electrically connected to the inverting terminal of the inverting op-amp 13 through the second resistance $R_2$. The bias input of the sine magnetic sensor 11 is electrically connected to the output terminal of the inverting op-amp 13, forming a feedback loop of the inverting op-amp 13. The non-inverting terminal of the inverting op-amp 13 is connected to ground.

In the configuration of FIG. 3B, the magnetic sensor device 10 outputs a device output voltage $V_{out}$ that follows a cotangent output voltage $V_{COTAN}$. In other words, the output voltage at the op-amp output terminal is the device output voltage $V_{out}$ and can be expressed by equation 5b:

$$V_{out} = K \cdot V_{dd} \cdot V_{COTAN} = K \cdot V_{dd} \cdot \cotan\theta. \qquad \text{Eq. 5b}$$

In a variant of the magnetic sensor device configuration of FIG. 3B, the sine output voltage $V_{SIN}$ of the sine magnetic sensor 11 is electrically connected to the inverting terminal of the op-amp 13 while the cosine output voltage $V_{COS}$ of the cosine magnetic sensor 1 is electrically connected to the non-inverting terminal of the op-amp 13.

Equations 5a and 5b imply that the amplitude of the device output voltage $V_{out}$ is determined only by the bias voltage $V_{dd}$ and, therefore, it is independent of the TMR ratio of the MTJ elements 20. This allows for increasing the signal-to-noise ratio (SNR) of the analog angular magnetic sensor device 10. This also allows for using MTJ elements 20 having low angular error AE regardless its TMR performance.

In one aspect illustrated in FIGS. 3a and 3b, the output of each of the sine and cosine magnetic sensors 11, 12 can be further electrically connected to an amplifier buffer 30 (voltage follower) and to a differential amplifier 31.

A device output voltage $V_{out}$ that follows a tangent output voltage $V_{TAN}$ can be calculated from the ratio of the sine output voltage $V_{SIN}$ over the cosine output voltage $V_{COS}$:

$$V_{TAN} = \frac{V_{SIN}}{V_{COS}} = \tan\theta. \qquad \text{Eq. 6a}$$

Similarly, a device output voltage $V_{out}$ that follows a cotangent output voltage $V_{COTAN}$ can be calculated from the ratio of the cosine output voltage $V_{COS}$ over the sine output voltage $V_{SIN}$:

$$V_{COTAN} = \frac{V_{COS}}{V_{SIN}} = \cotan\theta. \qquad \text{Eq. 6b}$$

Equations 6a and 6b show that the main feature of the magnetic sensor device 10 in the configuration of FIGS. 3A and 3B is only dependent on the orientation θ of the external magnetic field 60.

The magnetic sensor device 10 is stable against temperature and magnetic field amplitude and thus, is suitable for development of fast angular sensors by using LUTs or linearization correction schemes.

In some embodiments, the magnetic sensor device 10 can further comprise an analog-digital converter and a look up table (LUT) (not shown) connected in series at the device output voltage $V_{out}$. This enables a fast determination of the measured angle with a low AE for an external magnetic field orientation θ between −45° and 45°.

Figure 4:
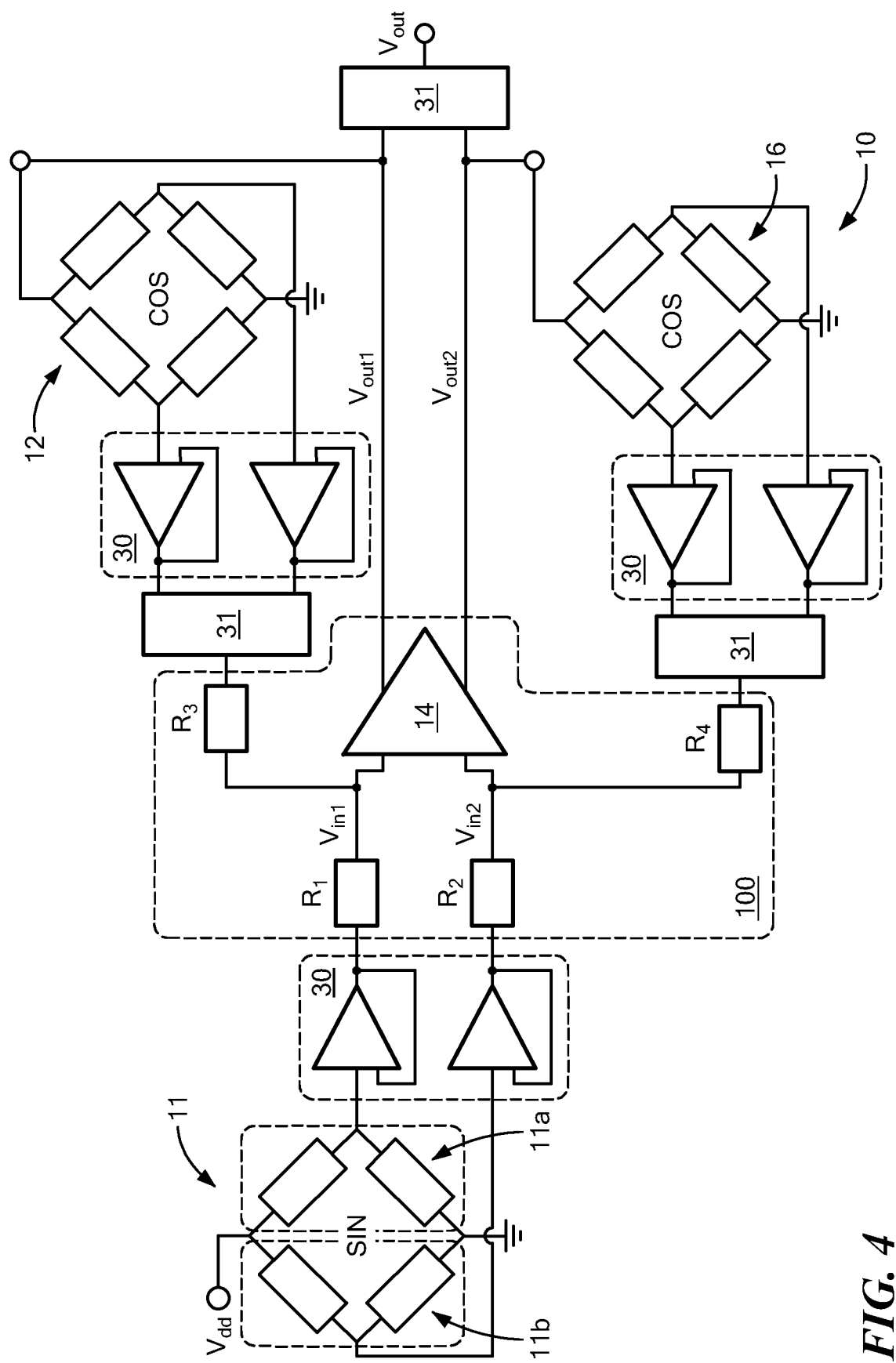
FIG. 4 shows the magnetic sensor device, according to another embodiment.

FIG. 4 shows the magnetic sensor device 10 according to another embodiment. The magnetic sensor device 10 comprises a sine magnetic sensor 11 configured to provide a sine output voltage $V_{SIN}$ and inputted by the bias voltage $V_{dd}$. The magnetic sensor device 10 further comprises a cosine magnetic sensor 12 and an additional cosine magnetic sensor 16. Both the cosine magnetic sensor 12 and the additional cosine magnetic sensor 16 are configured to provide a cosine output voltage $V_{COS}$. Each of the sine magnetic sensor 11 and the two cosine magnetic sensors 12, 16 comprises a plurality of MTJ elements 20 arranged in a full bridge circuit, as described above.

The magnetic sensor device 10 comprises an analog circuit 100 including a fully differential op-amp 14, a first, second, third and fourth resistance $R_1$, $R_2$, $R_3$, $R_4$. A first half branch 11a of the full bridge circuit arrangement of the sine magnetic sensor 11 is inputted to a first input voltage $V_{in1}$ of the fully differential op-amp 14 via the first resistance $R_1$. A second half branch 11b of the of the full bridge circuit arrangement of the sine magnetic sensor 11 is inputted to a second input voltage $V_{in2}$ of the fully differential op-amp 14 via the second resistance $R_2$. A first circuit output voltage $V_{out1}$ of the fully differential op-amp 14 biases the cosine magnetic sensor 12 and a second circuit output voltage $V_{out2}$ of the fully differential op-amp 14 biases the second cosine magnetic sensor 16. The output of the cosine magnetic sensor 12 is electrically connected to the first input terminal of the fully differential op-amp 14 via the third resistance $R_3$. The output of the additional cosine magnetic sensor 16 is electrically connected to the second input terminal of the fully differential op-amp 14 via the fourth resistance $R_4$.

As shown in FIG. 4, the output voltage of each of the first and second half branches 11a, 11b can be electrically connected to an amplifier buffer 30. The cosine output voltage $V_{COS}$ of the cosine magnetic sensor 12 and the additional cosine magnetic sensor 16 can be further electrically connected to an amplifier buffer 30 and to a differential amplifier 31.

In this configuration, the device voltage output $V_{out}$ corresponds to is the difference between the first circuit output voltage $V_{out1}$ and the second circuit output voltage $V_{out2}$. The device voltage output $V_{out}$ is proportional to the tangent of the orientation of the external magnetic field q.

$$V_{out} = V_{out1} - V_{out2} = -\frac{V_{dd}}{2} \cdot \left[ \frac{(1 + A \cdot \sin\theta)}{A \cdot \cos\theta} - \frac{(1 - A \cdot \sin\theta)}{A \cdot \cos\theta} \right] = \qquad \text{Eq. 6c}$$
$$K \cdot V_{dd} \cdot \tan\theta.$$

The first and second circuit output voltages $V_{out1}$, $V_{out2}$ can further be connected to an additional differential amplifier 31 to ensure a single-ended device output voltage $V_{out}$ of the magnetic sensor device 10.

Figure 5:
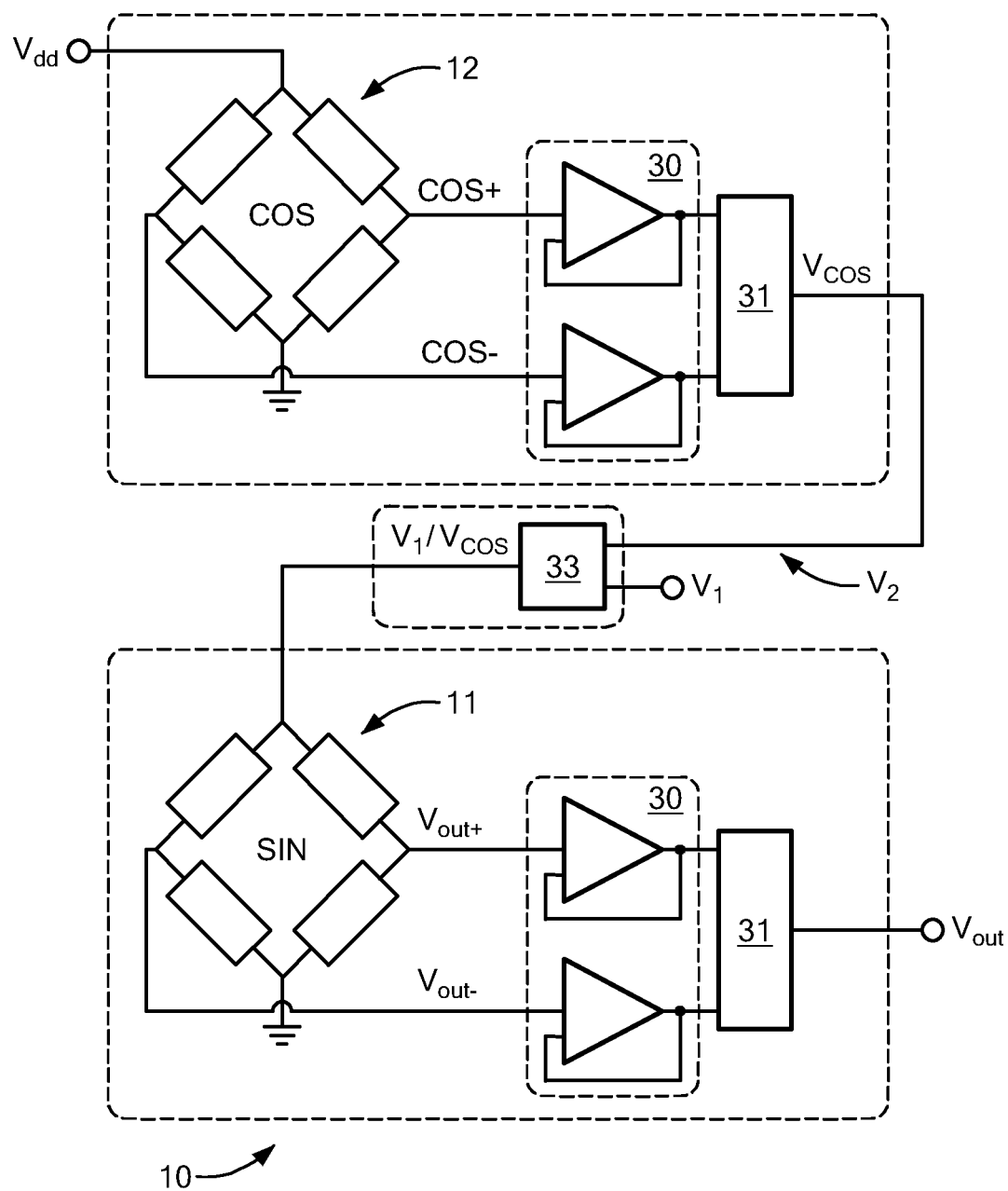
FIG. 5 shows the magnetic sensor device comprising an analog signal divider, according to an embodiment.

FIG. 5 shows the magnetic sensor device 10 according to yet another embodiment. The magnetic sensor device 10 comprises a sine magnetic sensor 11 configured to generate a sine output voltage $V_{SIN}$, and a cosine magnetic sensor 12 configured to generate a cosine output voltage $V_{COS}$. Each of the sine and cosine magnetic sensors 11, 12 comprises a plurality of MTJ elements 20 arranged in a full bridge circuit, as described above. The cosine magnetic sensor 12 is connected in cascade with the sine magnetic sensor 11 via an analog circuit 100 comprising an analog signal divider 33. More particularly, the cosine output voltage $V_{COS}$ of the cosine magnetic sensor 12 is electrically connected to an input of the analog signal divider 33. The bias input of the sine magnetic sensor 11 is electrically connected to the output of the analog signal divider 33.

The analog circuit 100 is configured to "invert" the cosine output voltage $V_{COS}$. In particular, the analog signal divider 33 is configured to divide a first divider input voltage $V_{div1}$, of a first divider input terminal of the analog signal divider 33, by a second divider input voltage $V_{div2}$, of a second divider input terminal of the analog signal divider 33. The analog circuit 100 generates a divider output voltage $V_{out-div}$ described by equation 7a:

$$V_{out-div} = k \cdot V_1 / V_2, \qquad \text{Eq. 7a}$$

wherein k is a constant.

Equation 7a can also be expressed as:

$$V_{out-div} = k \cdot V_1 / (V_{dd} A \cos\theta), \qquad \text{Eq. 7b}$$

where A is the amplitude of the cosine magnetic sensor 12 and $V_{dd}$ is the bias voltage biasing the cosine magnetic sensor 12. Therefore, the divider output voltage $V_{out\text{-}div}$ biasing the sine magnetic sensor 11 results in a device output voltage $V_{out}$ that is defined by Equation 8:

$$V_{out} = V_{div} \cdot V_{SIN} = \left(\frac{V_1}{V_{dd} \cdot A \cdot \cos\theta}\right) \cdot (A \cdot \sin\theta) = \frac{V_1}{V_{dd}} \cdot \tan\theta. \quad \text{Eq. 8}$$

Both sine and cosine magnetic sensors 11, 12 can be further electrically connected to an amplifier buffer 30 and to a differential amplifier 31.

Figure 6A:
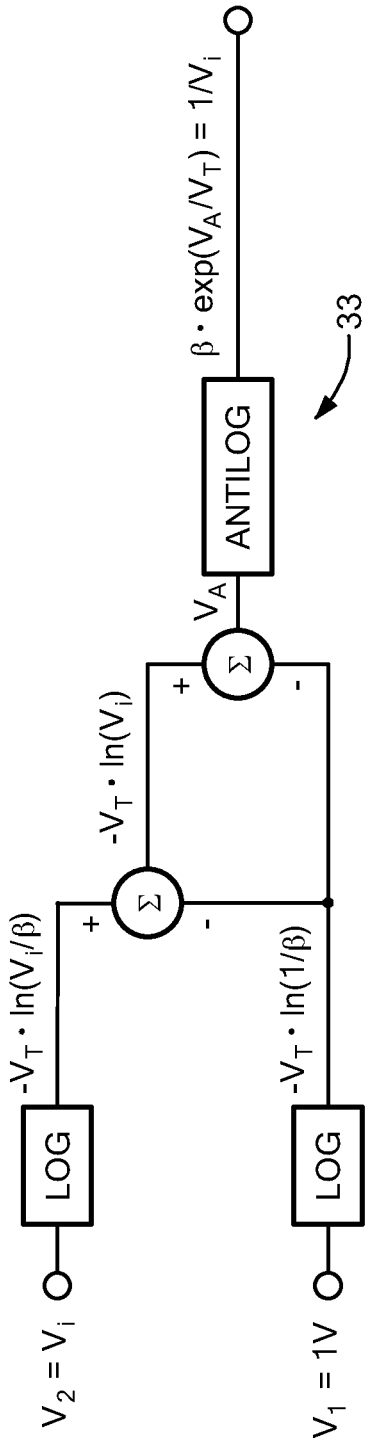
FIGS. 6A and 6B show possible circuit architectures for the analog signal divider 33, based on LOG and ANTILOG op-amps.
Figure 6B:
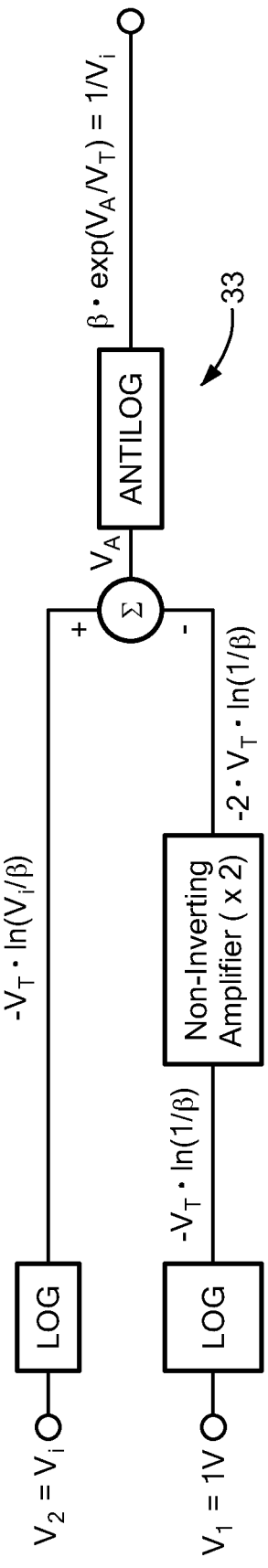

FIGS. 6A and 6B show possible circuit architectures for the analog signal divider 33, based on LOG and ANTILOG op-amps.

Figure 7A:
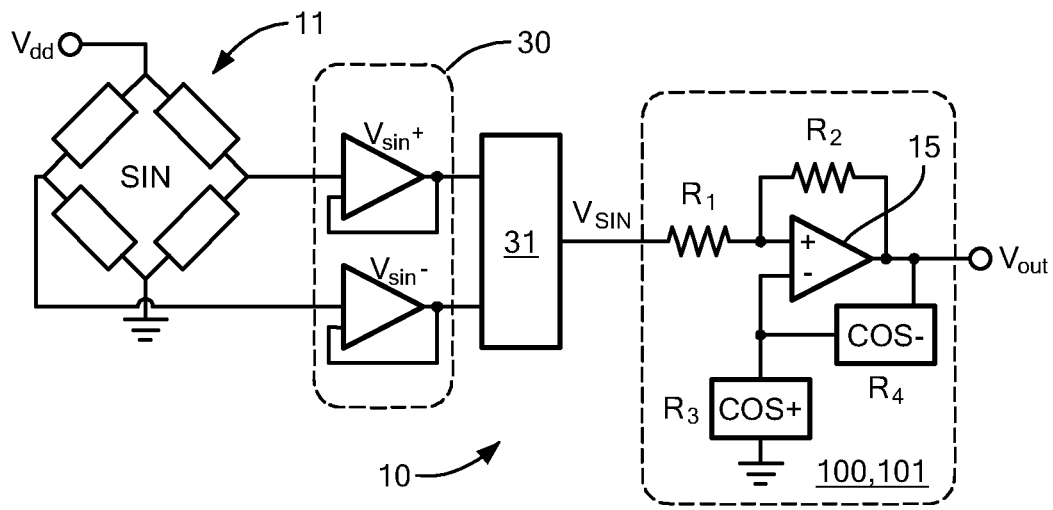
FIG. 7A shows the magnetic sensor device, according to yet another embodiment.
Figure 7B:
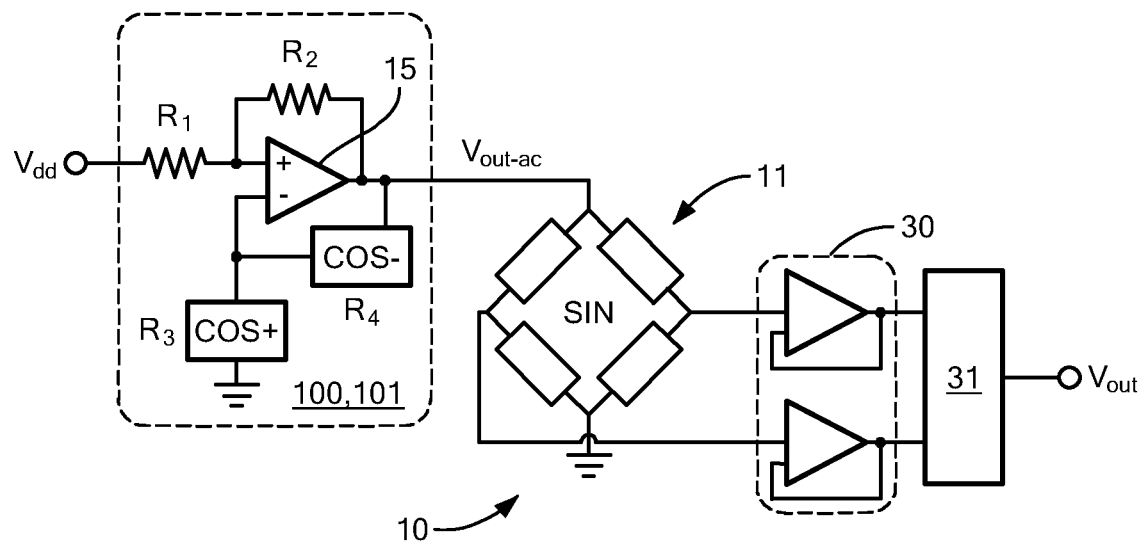
FIG. 7B shows a variant of the magnetic sensor device of FIG. 7A.

FIGS. 7A and 7B show the magnetic sensor device 10 according to yet another embodiment. The angular magnetic sensor device 10 can comprise only one sine magnetic sensor 11 configured to generate a sine output voltage $V_{SIN}$ following Eq. 2b. Note that the angular magnetic sensor device 10 could comprise more than one sine magnetic sensor 11. The angular magnetic sensor device 10 further comprises an analog circuit 100 including a first sub-circuit 101. The first sub-circuit 101 comprises an operational amplifier (op-amp) 15. A first resistance $R_1$ is connected to a non-inverting terminal of the op-amp 15. A second resistance $R_2$ is connected between the non-inverting terminal and an op-amp output $V_{out}$ of the-amp 15, forming a positive feedback loop of the op-amp 15. The inverting terminal is connected to ground via a third resistance $R_3$, while a fourth resistance $R_4$ is connected between the inverting terminal and the op-amp output $V_{out}$ of the-amp 15, forming a negative feedback loop of the op-amp 15. The sine magnetic sensor 11 comprises a plurality of MTJ elements 20 arranged in a full bridge circuit, as described above.

In the configuration of FIG. 7A, both half-branch output voltages of the sine magnetic sensor 11 ($V_{SIN}^+$ and $V_{SIN}^-$) are electrically connected to an amplifier buffer 30 and to a differential amplifier 31, so the sine output voltage $V_{SIN}=V_{SIN}^+-V_{SIN}^-$. Additionally, the sine output voltage $V_{SIN}$ of the sine magnetic sensor 11 is electrically connected to the non-inverting terminal of the op-amp 15 via the first resistance $R_1$. The sine magnetic sensor 11 is biased by a bias voltage $V_{dd}$. The circuit output voltage $V_{out\_ac}$ of the first sub-circuit 101 corresponds to the device output voltage $V_{out}$.

In the configuration of FIG. 7B, an analog circuit voltage output $V_{out\text{-}ac}$ of the first sub-circuit 101 is electrically connected to the bias input of the sine magnetic sensor 11, and the first sub-circuit 101 is biased by a bias voltage $V_{dd}$.

The analog circuit voltage output $V_{out\text{-}ac}$ of the analog circuit 100 can be expressed as:

$$V_{out-ac} = \frac{R_2 \cdot (R_3 + R_4)}{R_2 \cdot R_3 - R_1 \cdot R_4} \cdot V_{in}, \quad \text{Eq. 9}$$

where $V_{in}$ is an input voltage of the analog circuit 100. The input voltage $V_{in}$ can correspond to the sine output voltage $V_{SIN}$ of the sine magnetic sensor 11 in the case of the configuration of FIG. 7A or to the bias voltage $V_{dd}$ in the case of the configuration of FIG. 7B.

In one aspect, the first and second resistances $R_1$, $R_2$ can be identical ($R_1=R_2$). The third and fourth resistances $R_3$, $R_4$ can be TMR elements having a resistance that follows a pseudo-cosine response with respect to the orientation of the external magnetic field. In this case:

$$G_3 = G_0 \cdot (1 - A \cdot \cos\theta) = 1/R_3, \quad \text{Eq. 10a}$$

$$G_4 = G_0 \cdot (1 + A \cdot \cos\theta) = 1/R_4, \quad \text{Eq. 10b}$$

where $G_3$ and $G_4$ are respectively the conductance of resistance elements $R_3$ and $R_4$ and $G_0$ is the conductance at $\theta=0$. Note that conductance of resistance elements $R_1$ and $R_2$ can also be expressed as $G_1=1/R_1$ and $G_2=1/R_2$. Therefore, resistances $R_3$ and $R_4$ of both TMR elements can be written as:

$$R_3 = \frac{1}{G_0 \cdot (1 - A \cdot \cos\theta)}, \quad \text{Eq. 10c}$$

$$R_4 = \frac{1}{G_0 \cdot (1 + A \cdot \cos\theta)}. \quad \text{Eq. 10d}$$

Note that equations 10c and 10d imply that, generally, the resistance of such TMR elements does not follow a cosine response. Only for TMR elements with small TMR ratio (and therefore small amplitude A, i.e. A<<1) the resistance of such TMR elements will show a cosine response. Therefore, and for the sake of clarity, the resistance response described by Eq. 10c will be defined as a COS+ response, while the resistance response described by Eq. 10d will be defined as COS− response. At such conditions, the analog circuit output voltage response $V_{out\text{-}ac}$ of equation 9 then becomes:

$$V_{out-ac} = \left(\frac{1}{A \cdot \cos\theta}\right) \cdot V_{in}. \quad \text{Eq. 10e}$$

Therefore, if the input voltage $V_{in}$ of the analog circuit 100 is a sine output voltage $V_{SIN}$ generated by the sine magnetic sensor 11 (as shown in FIG. 7A), then, the output voltage $V_{out}$ of the magnetic sensor device 10 follows a tangent output voltage $V_{TAN}$ and can be expressed by equation 10f:

$$V_{out} = V_{TAN} = V_0 \cdot \tan\theta. \quad \text{Eq. 10f}$$

Note that the sine magnetic sensor 11 can also be connected in cascade at the output of the analog circuit 100 (FIG. 7B) leading to the same tangent output voltage $V_{TAN}$ expressed by Eq. 10f.

Note, also, that a similar outcome can be obtained by opposite programming conditions of the tunnel magnetoresistive (TMR) elements. Indeed if:

$$R_3 = \frac{1}{G_0 \cdot (1 + A \cdot \cos\theta)} \quad \text{Eq. 10g}$$

$$R_4 = \frac{1}{G_0 \cdot (1 - A \cdot \cos\theta)}, \quad \text{Eq. 10h}$$

the analog circuit output voltage response $V_{out\text{-}ac}$ of equation 9 then becomes:

$$V_{out-ac} = -\left(\frac{1}{A \cdot \cos\theta}\right) \cdot V_{in}. \quad \text{Eq. 10i}$$

In these conditions, the device output voltage $V_{out}$ of the magnetic sensor device 10 can be expressed by equation 10j:

$$V_{out} = -V_{TAN} = -V_0 \cdot \tan\theta. \quad \text{Eq. 10j}$$

Figure 8A:
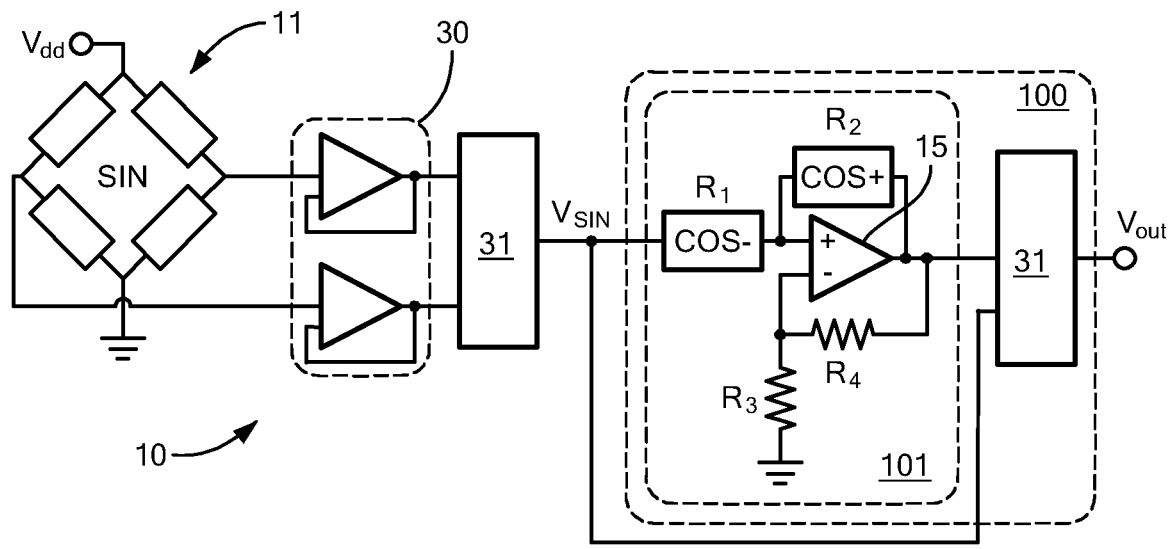
FIG. 8A shows the magnetic sensor device, according to yet another embodiment.

In another embodiment shown in FIG. 8A, the sine output voltage $V_{SIN}$ of the sine magnetic sensor 11 is electrically connected to the analog circuit 100 (connected to the non-inverting terminal of the op-amp 15 via the first resistance $R_1$). The sine magnetic sensor 11 is biased by a bias voltage $V_{dd}$. The analog circuit 100 includes the first sub-circuit 101 (as in FIGS. 7a and 7b). The analog circuit 100 can further comprise an additional differential amplifier 31 which is electrically connected to the circuit output voltage $V_{out\_ac}$ of the first sub-circuit 101 and to the sine output voltage $V_{SIN}$ of the sine magnetic sensor 11. The output voltage of the additional differential amplifier 31 corresponds to the output voltage of the analog circuit 100 and also corresponds to the device output voltage $V_{out}$ of the magnetic sensor device 10.

Figure 8B:
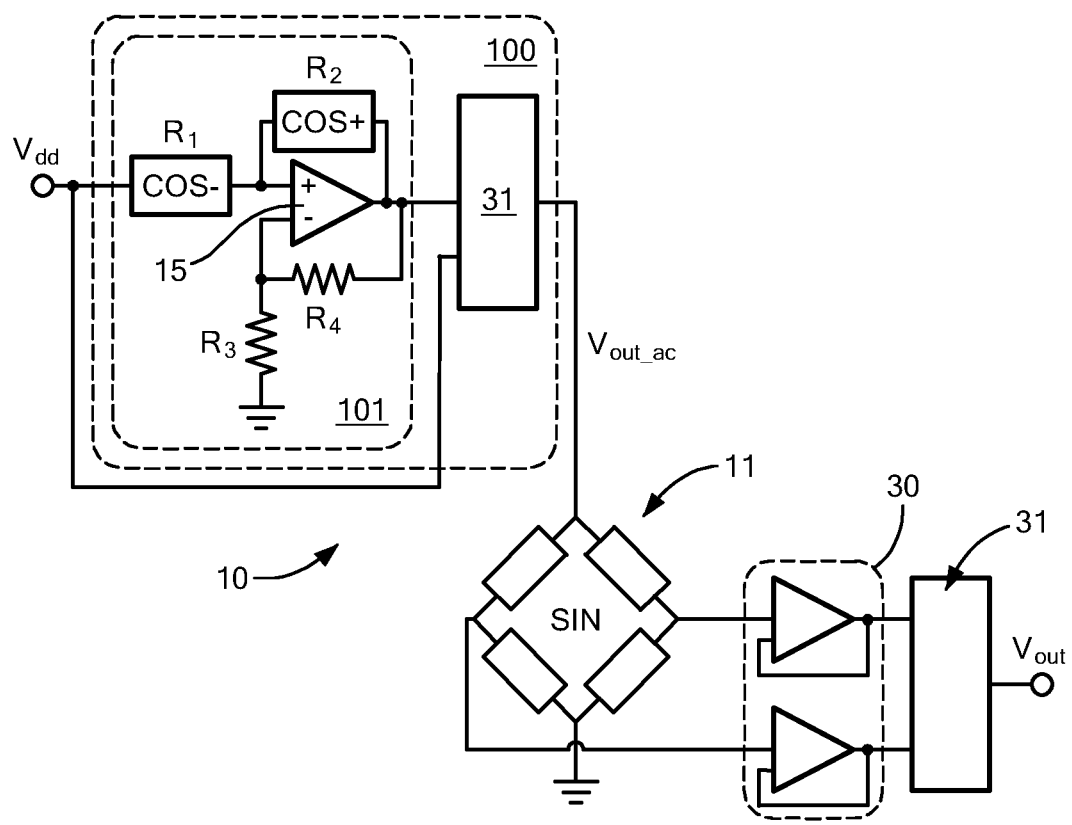
FIG. 8B shows a variant of the magnetic sensor device of FIG. 8A.

In the alternative configuration of FIG. 8B, the analog circuit 100 is biased by a bias voltage $V_{dd}$. The analog circuit 100 includes the first sub-circuit 101 (as in FIGS. 7a and 7b). The analog circuit 100 can further comprise an additional differential amplifier 31 that is electrically connected to the circuit output voltage $V_{out\_ac}$ of the first sub-circuit 101 and to the bias voltage $V_{dd}$. The output voltage of the additional differential amplifier 31 corresponds to the output voltage of the analog circuit 100 and the output voltage of the analog circuit 100 is used as a bias voltage of the sine magnetic sensor 11. The output voltage of the sine magnetic sensor 11 corresponds to the device output voltage $V_{out}$ of the magnetic sensor device 10.

The output voltage $V_{out}$ of the magnetic sensor device 10 of FIGS. 8a and 8b follows a tangent output voltage $V_{TAN}$ such as described by equation 10d.

In both configurations of FIGS. 8A and 8B, the sine magnetic sensor 11 can be further electrically connected to an amplifier buffer 30 and to a differential amplifier 31.

In both configurations of FIGS. 8A and 8B, the analog circuit 100 can be configured such that the third resistance $R_3$ and fourth resistance $R_4$ are equal ($R_3=R_4$), and the first and second resistances $R_1$, $R_2$ are TMR elements having a resistance that follows a pseudo-cosine response with respect to the orientation of the external magnetic field, with the first resistance $R_1$ following a COS− response and the second resistance $R_2$ following a COS+ response described by:

$$R_2 = \frac{1}{G_0 \cdot (1 - A \cdot \cos\theta)}, \quad \text{Eq. 11a}$$

$$R_1 = \frac{1}{G_0 \cdot (1 + A \cdot \cos\theta)}. \quad \text{Eq. 11b}$$

For this configuration, the analog circuit voltage output $V_{out\text{-}ac}$ of equation 9 then becomes:

$$V_{out-ac} = \left(\frac{1}{A \cdot \cos\theta} + 1\right) \cdot V_{in}. \quad \text{Eq. 11c}$$

Therefore, if the output of the sine magnetic sensor 11 is used as the input voltage $V_{in}$ of the analog circuit 100, then $V_{in}$ can be subtracted by a differential amplifier 31 connected to the output of the first sub-circuit 101 and to the output of the sine magnetic sensor 11 (as shown in FIG. 8A). For such a configuration, the output terminal of the differential amplifier 31 generates the output voltage $V_{out}$ of the magnetic sensor device 10. If the sine magnetic sensor 11 is configured to generate a sine output voltage $V_{SIN}$, the output voltage $V_{out}$ of the magnetic sensor device 10 will follow a tangent output voltage $V_{TAN}$ as expressed by equation 10f.

Note that a similar response can be obtained if the output terminal of the analog circuit 100 is connected to the bias input of the sine magnetic sensor 11 (as shown in FIG. 8B). For this embodiment a $V_{dd}$ voltage is the input voltage of the analog circuit 100 (i.e. $V_{dd}$ is $V_{in}$ of Eq. 11c) and both $V_{dd}$ and the output of the first sub-circuit 101 are connected to the input terminals of the additional differential amplifier 31. For such configuration, the sine magnetic sensor 11 generates the output voltage $V_{out}$ of the magnetic sensor device 10, which follows a tangent output voltage $V_{TAN}$ as expressed by equation 10f.

Note that an opposite programming conditions of the tunnel magnetoresistive (TMR) elements would lead to a similar outcome. Indeed if:

$$R_2 = \frac{1}{G_0 \cdot (1 + A \cdot \cos\theta)}, \quad \text{Eq. 11d}$$

and $$R_1 = \frac{1}{G_0 \cdot (1 - A \cdot \cos\theta)}, \quad \text{Eq. 11e}$$

the analog circuit output voltage response $V_{out\text{-}ac}$ of equation 9 becomes:

$$V_{out-ac} = \left(-\frac{1}{A \cdot \cos\theta} + 1\right) \cdot V_{in}. \quad \text{Eq. 11f}$$

In these conditions, the device output voltage $V_{out}$ of the magnetic sensor device 10 can be expressed by equation 11g:

$$V_{out} = -V_{TAN} = -V_0 \cdot \tan\theta. \quad \text{Eq. 11g}$$

Note that the sine magnetic sensor 11 is further electrically connected to an amplifier buffer 30 and to a differential amplifier 31.

Figure 9A:
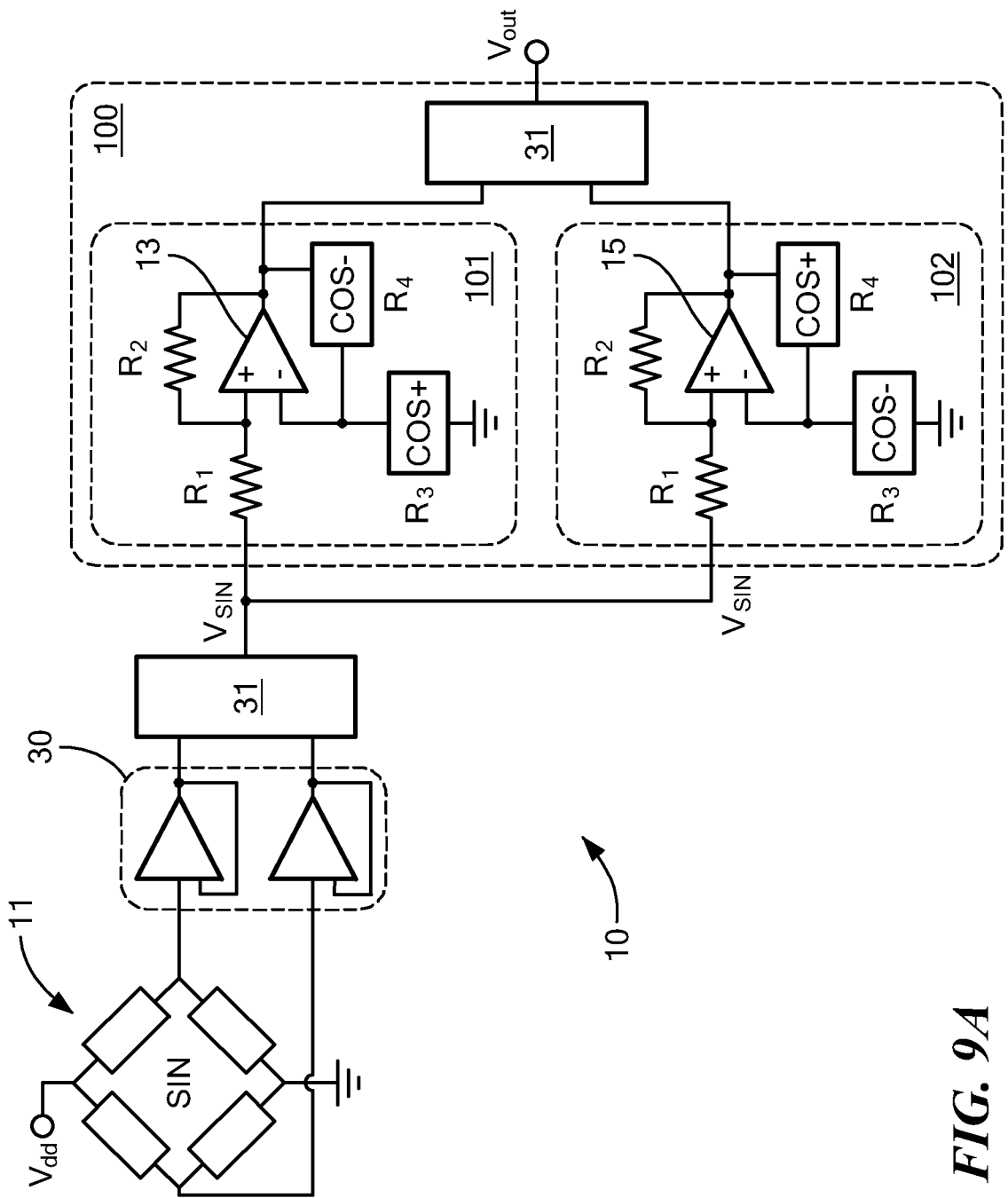
FIG. 9A shows the magnetic sensor device, according to yet another embodiment.
Figure 9B:
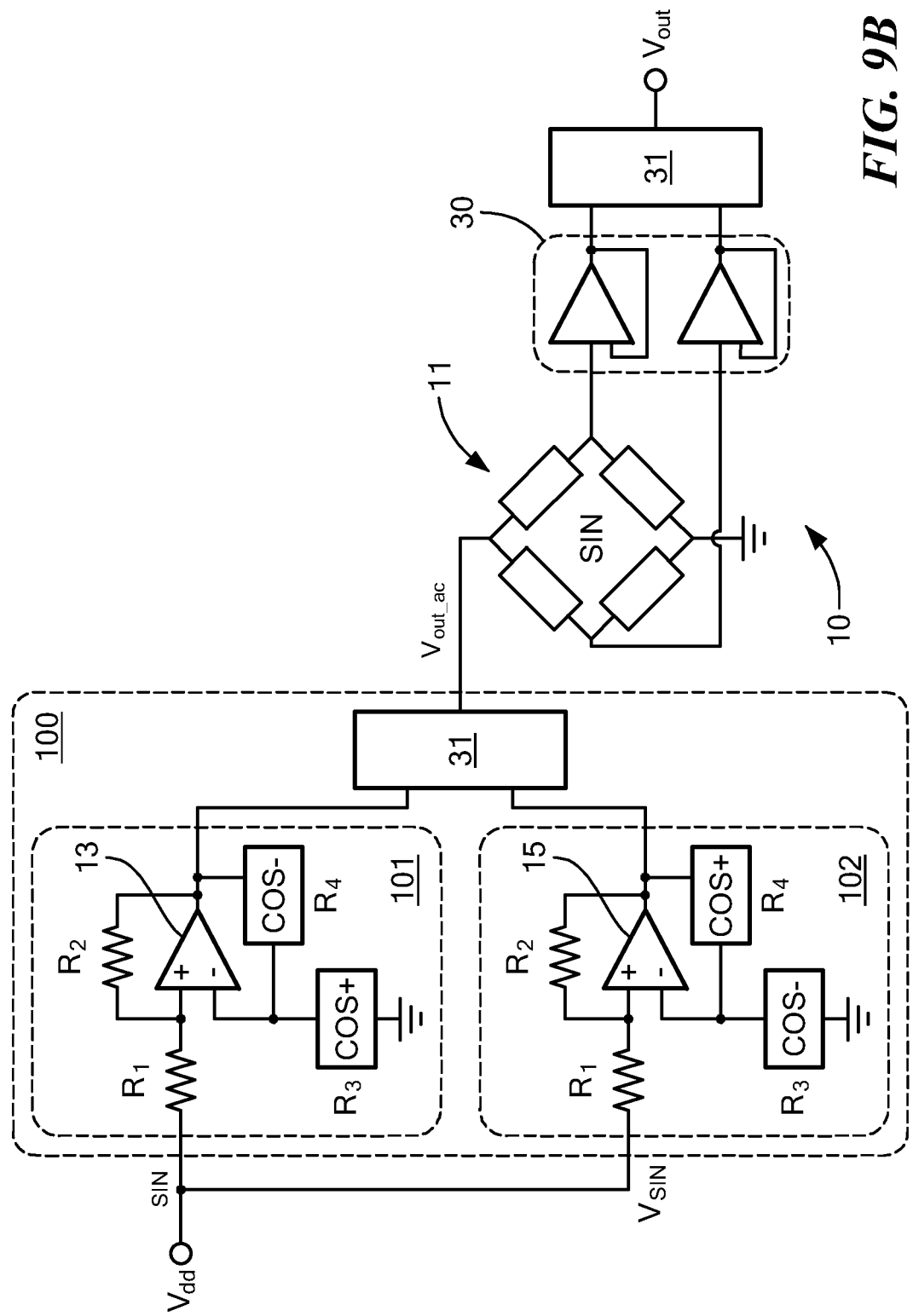
FIG. 9B shows a variant of the magnetic sensor device of FIG. 9A.

FIGS. 9A and 9B show the magnetic sensor device 10 according to yet another embodiment. In comparison to the configurations shown in FIGS. 8a and 8b, the analog circuit 100 comprises a first sub-circuit 101 and a second sub-circuit 102 as well as an additional differential amplifier 31. The first and second sub-circuits 101, 102 have a similar configuration as the analog circuit 100 shown in FIGS. 7a and 7b. However, here the third and fourth resistances $R_3$, $R_4$ of the first sub-circuit 101 are programmed opposite to the ones of the second sub-circuit 102. In other words, the pseudo-cosine response of the each of the third and fourth resistances $R_3$, $R_4$ of the first sub-circuit 101 is opposite to the pseudo-cosine response of the third and fourth resistances $R_3$, $R_4$ of the second sub-circuit 102. In other words, in the first sub-circuit 101, the third resistance $R_3$ is a TMR element with a resistance following a COS+ response (as described by Eq. 10c) and the fourth resistance $R_4$ is a TMR element with a resistance following a COS− response (as described by Eq. 10d). In the second sub-circuit 102, the third resistance $R_3$ is a TMR element with a resistance following a COS− response and the fourth resistance $R_4$ is a TMR element with a resistance following a COS+ response. In both first and second sub-circuits 101, 102, the first resistance $R_1$ and the second resistance $R_2$ are equal ($R_1=R_2$).

For this embodiment, the TMR elements of the first sub-circuit 101 are described as:

$$R_3 = \frac{1}{G_0 \cdot (1 - A \cdot \cos\theta)}, \quad \text{Eq. 12a}$$

$$R_4 = \frac{1}{G_0 \cdot (1 + A \cdot \cos\theta)}, \quad \text{Eq. 12b}$$

and the output voltage of the first sub-circuit 101 $V_{out\text{-}ac}$ can be described by:

$$V_{out-ac} = \left(\frac{1}{A \cdot \cos\theta}\right) \cdot V_{in}. \quad \text{Eq. 12c}$$

For this embodiment, the TMR elements of the second sub-circuit 102 are described as:

$$R_3 = \frac{1}{G_0 \cdot (1 + A \cdot \cos\theta)}, \quad \text{Eq. 13a}$$

$$R_4 = \frac{1}{G_0 \cdot (1 - A \cdot \cos\theta)}, \quad \text{Eq. 13b}$$

and the output voltage of the second sub-circuit 102 $V_{out\text{-}ac}$ can be described by:

$$V_{out-ac} = -\left(\frac{1}{A \cdot \cos\theta}\right) \cdot V_{in}. \quad \text{Eq. 13c}$$

In the configuration of the angular magnetic sensor device 10 of FIG. 9A, the sine output voltage $V_{SIN}$ of the sine magnetic sensor 11 is electrically connected to the first and second sub-circuits 101, 102 (to the non-inverting terminal of the op-amp 13 via the first resistance $R_1$ for the first sub-circuit 101 and to the non-inverting terminal of the op-amp 15 via the first resistance $R_1$ for the second sub-circuit 102). The sine magnetic sensor 11 is biased by a bias voltage $V_{dd}$. The additional differential amplifier 31 is connected to the output of the first and second sub-circuits 101, 102, so the output voltage of the additional differential amplifier 31 is the output voltage of the analog circuit 100, and therefore corresponds to the output voltage $V_{out}$ of the magnetic sensor device 10, and can be described by:

$$V_{out} = \left(\frac{1}{A \cdot \cos\theta}\right) \cdot V_{in} - \left[-\left(\frac{1}{A \cdot \cos\theta}\right) \cdot V_{in}\right] = \left(\frac{2}{A \cdot \cos\theta}\right) \cdot V_{in} = 2 \cdot \tan\theta. \quad \text{Eq. 13d}$$

In the alternative configuration of the angular magnetic sensor device 10 of FIG. 9B, the first and second sub-circuits 101, 102 are biased by a bias voltage $V_{dd}$. The analog circuit output voltages $V_{out\text{-}ac}$ of both the first and second sub-circuits 101, 102 are electrically connected to the additional differential amplifier 31, so the output of the additional differential amplifier 31 is connected to the bias input of the sine magnetic sensor 11. Here, the output voltage of the sine magnetic sensor 11 is the device output voltage $V_{out}$ of the magnetic sensor device 10 and is described by equation 13d.

Note that a similar result can also be obtained by permuting the first sub-circuit 101 with respect to second sub-circuit 102. Note also, that the sine magnetic sensor 11 further comprises an amplifier buffer 30 at the output of each half-branch of the magnetic sensor 11 and to a differential amplifier 31.

Figure 10A:
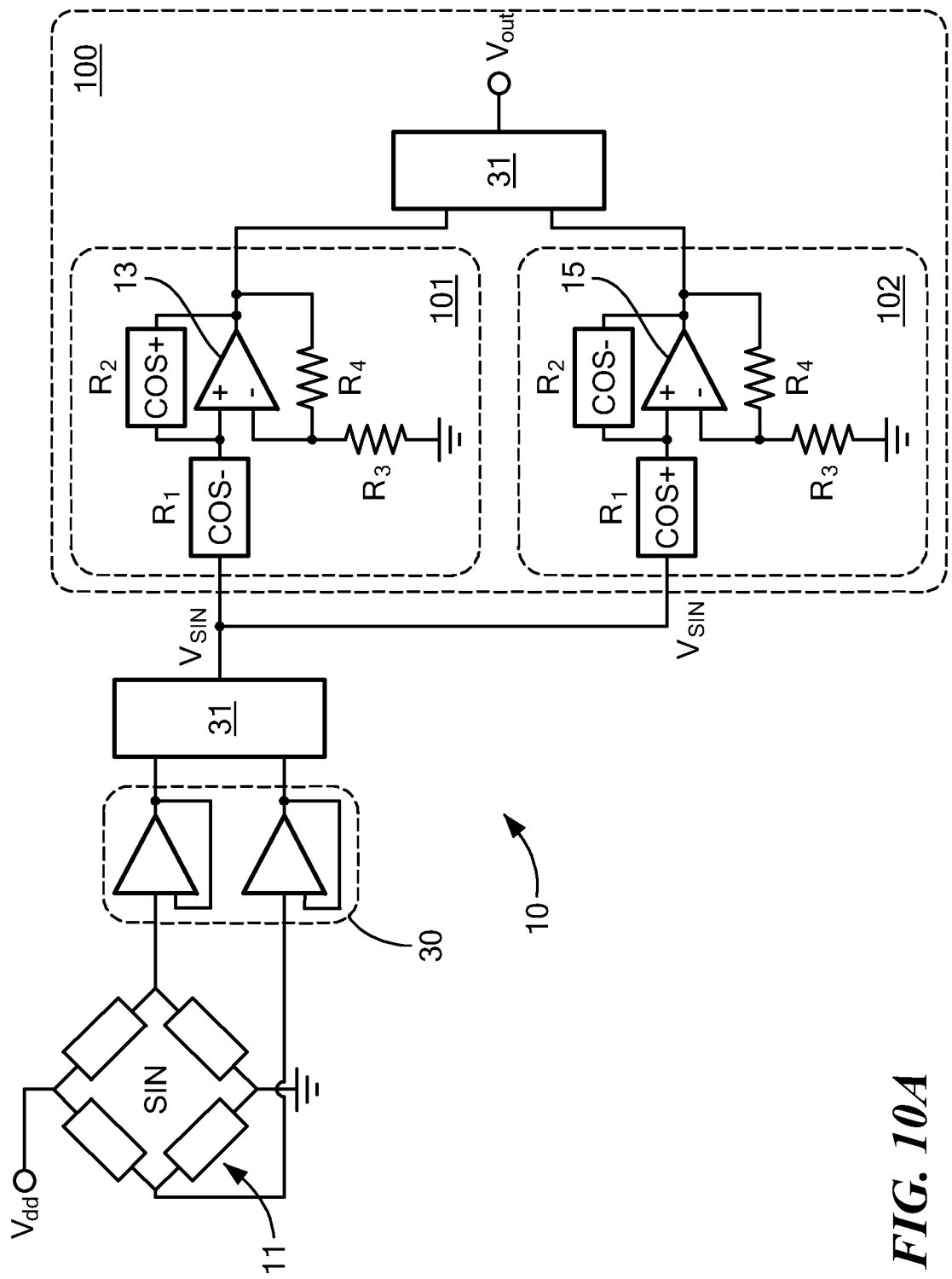
FIG. 10A shows the magnetic sensor device, according to yet another embodiment.
Figure 10B:
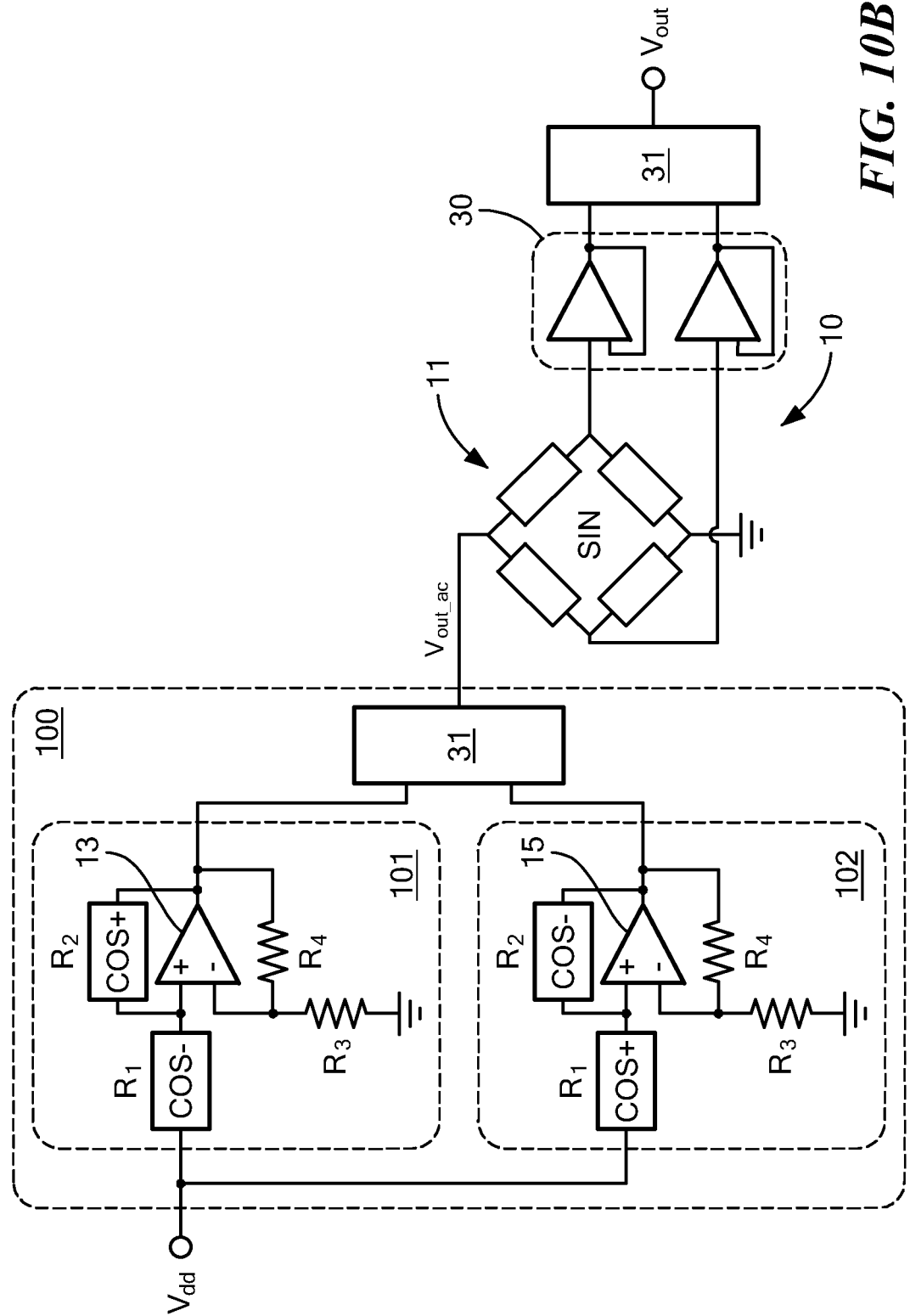
FIG. 10B shows a variant of the magnetic sensor device of FIG. 10A.

FIGS. 10A and 10B show the magnetic sensor device 10 according to a variant of configurations shown in FIGS. 9A and 9B. More particularly, the analog circuit 100 comprises a first and second sub-circuits 101, 102, wherein the first sub-circuit 101 includes a first TMR element with resistance $R_1$ following a COS− response, and a second TMR element with resistance $R_2$ following a COS+ response, as shown by equations 14a and 14b respectively (see below). The second sub-circuit 102 comprises a first TMR element with resistance $R_1$ following a COS+ response and a second TMR element with resistance $R_2$ following a COS− response. In other words, the pseudo-cosine response of the first and second resistances $R_1$, $R_2$ of the first sub-circuit 101 is opposite to the pseudo-cosine response of the first and second resistances $R_1$, $R_2$ of the second sub-circuit 102. In both first and second sub-circuits 101, 102, the third resistance $R_3$ and the fourth resistance $R_4$ are equal ($R_3=R_4$).

For this embodiment, the TMR elements of the first sub-circuit 101 are described as:

$$R_1 = \frac{1}{G_0 \cdot (1 + A \cdot \cos\theta)}, \quad \text{Eq. 14a}$$

$$R_2 = \frac{1}{G_0 \cdot (1 - A \cdot \cos\theta)}, \quad \text{Eq. 14b}$$

and the output voltage of the first sub-circuit 101 $V_{out\text{-}ac}$ can be described by:

$$V_{out-ac} = \left(\frac{1}{A \cdot \cos\theta} + 1\right) \cdot V_{in}. \quad \text{Eq. 14c}$$

For this embodiment, the TMR elements of the second sub-circuit 102 are described as:

$$R_1 = \frac{1}{G_0 \cdot (1 - A \cdot \cos\theta)}, \quad \text{Eq. 14d}$$

$$R_2 = \frac{1}{G_0 \cdot (1 + A \cdot \cos\theta)}, \quad \text{Eq. 14e}$$

and the output voltage of the second sub-circuit 102 $V_{out-ac}$ can be described by:

$$V_{out-ac} = \left(-\frac{1}{A \cdot \cos\theta} + 1\right) \cdot V_{in}. \qquad \text{Eq. 14f}$$

In the configuration of the magnetic sensor device 10 of FIG. 10A, the sine output voltage $V_{SIN}$ of the sine magnetic sensor 11 is electrically connected to the first and second sub-circuits 101, 102 (to the non-inverting terminal of the op-amp 13, 15 via their first TMR element $R_1$). The sine magnetic sensor 11 is biased by a bias voltage $V_{dd}$. The additional differential amplifier 31 of the analog circuit 100 is connected to the output of the first and second sub-circuits 101, 102, such that the output of the differential amplifier 31 is the output voltage of the analog circuit 100 and corresponds to the device output voltage $V_{out}$ of the magnetic sensor device 10 and is described by:

$$V_{out} = \left(\frac{1}{A \cdot \cos\theta} + 1\right) \cdot V_{in} - \left[-\left(-\frac{1}{A \cdot \cos\theta} + 1\right) \cdot V_{in}\right] = \qquad \text{Eq. 14j}$$
$$\frac{2}{A \cdot \cos\theta} \cdot V_{in} = 2 \cdot \tan\theta$$

In the alternative configuration of the angular magnetic sensor device 10 of FIG. 10B, analog circuit 100 is biased by a bias voltage $V_{dd}$ and therefore, both the first and second sub-circuits 101 and 102 are biased by a bias voltage $V_{dd}$. The output voltage of the differential amplifier 31 of the analog circuit 100 is electrically connected to the bias input of the sine magnetic sensor 11.

The device output voltage $V_{out}$ of the magnetic sensor device 10 of FIG. 10b follows a similar tangent output voltage as described by equation 14j.

Note that a similar result can also be obtained by permuting the first sub-circuit 101 with respect to second sub-circuit 102. Note also, that the sine magnetic sensor 11 further comprises amplifier buffers 30 at the output of each half-branch of the sine magnetic sensor 11 and a differential amplifier 31.

Figure 11A:
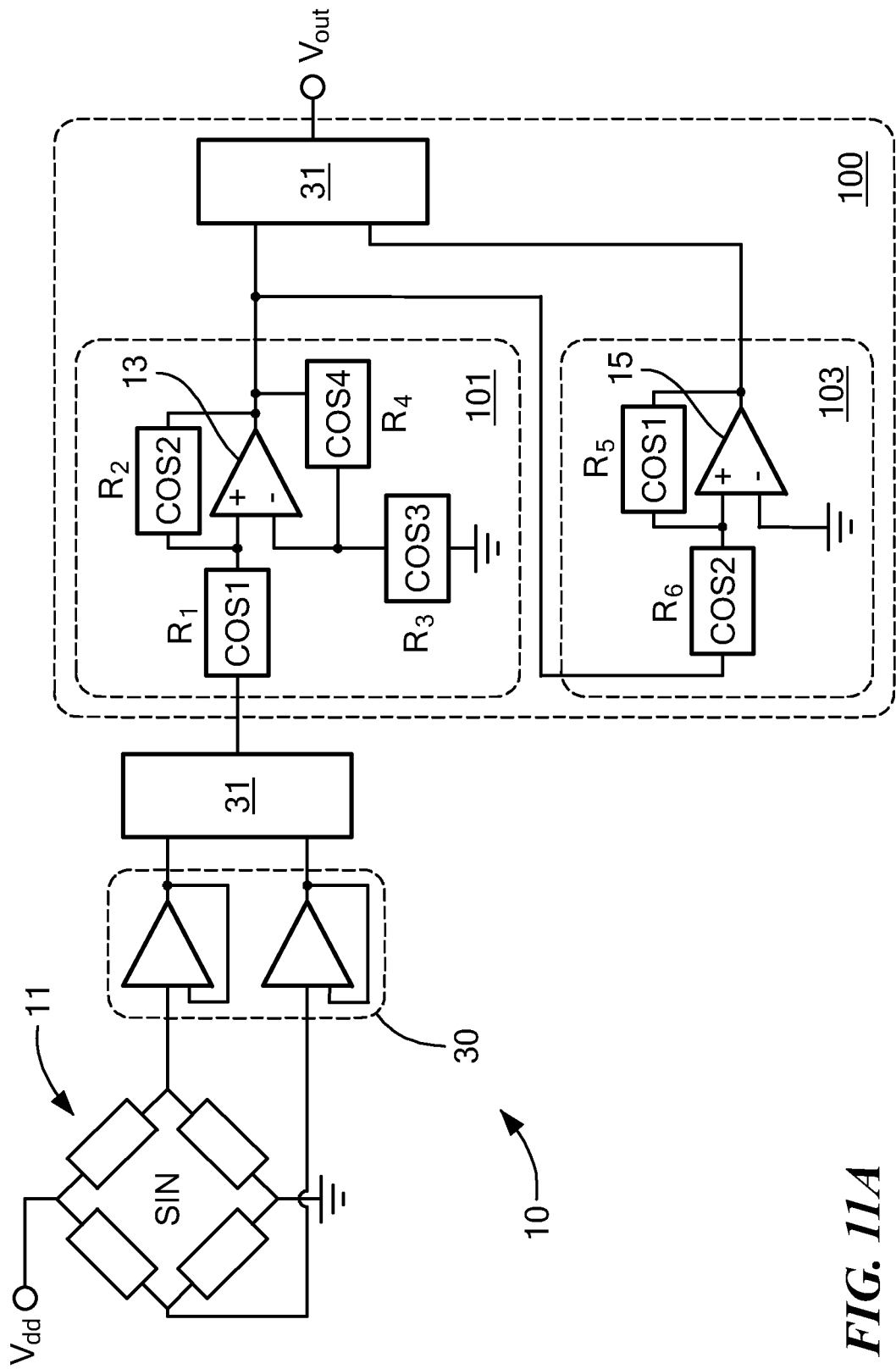
FIG. 11A shows the magnetic sensor device, according to yet another embodiment.
Figure 11B:
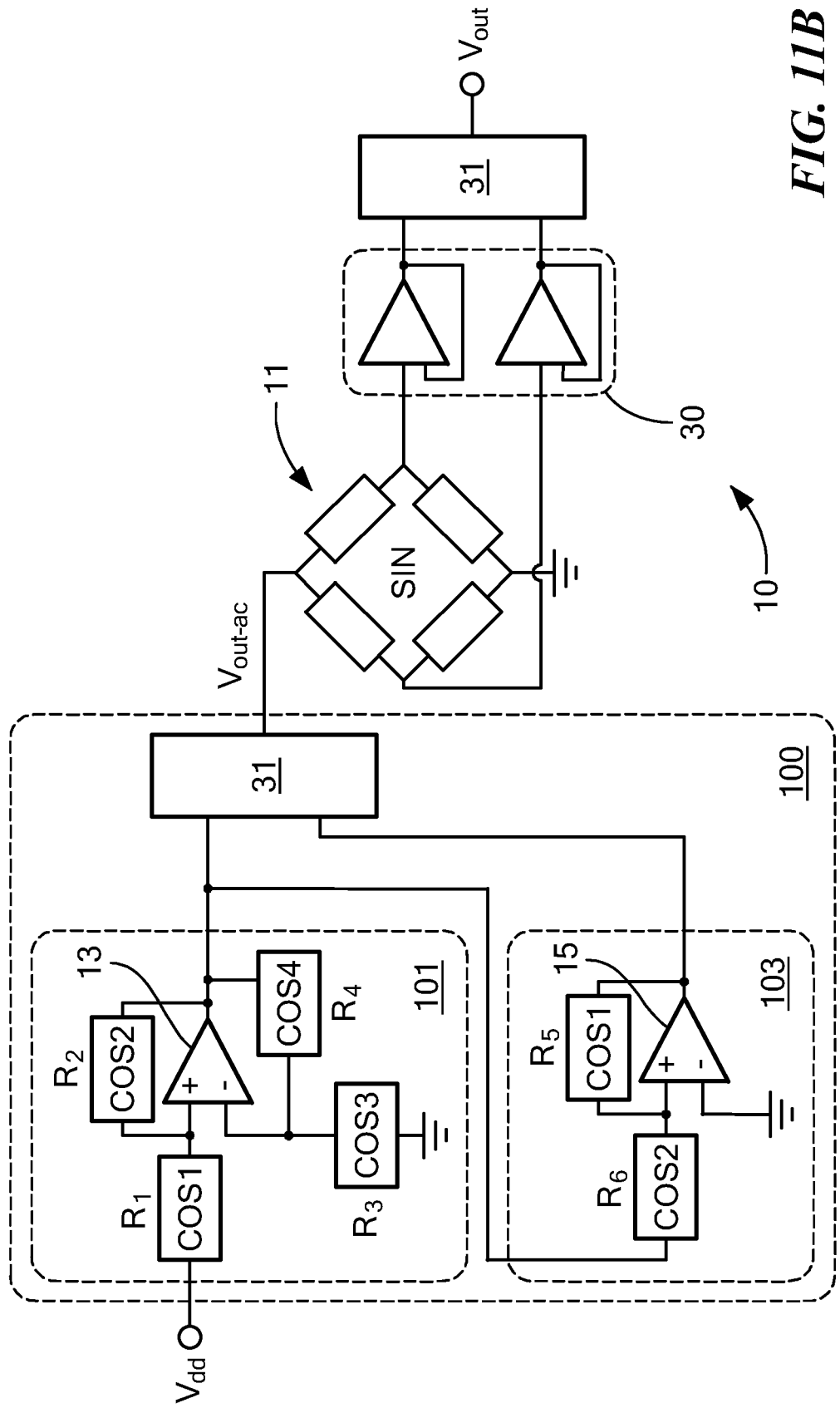
FIG. 11B shows a variant of the magnetic sensor device of FIG. 11A.

FIGS. 11A and 11B show the magnetic sensor device 10 according to yet another embodiment. Here, the analog circuit 100 comprises a first sub-circuit 101 including an inverting op-amp 13 and four resistances $R_1$, $R_2$, $R_3$ and $R_4$. The four resistances $R_1$-$R_4$ can comprise TMR elements having a resistance that follows a pseudo-cosine response with respect to the orientation of the external magnetic field (described by Eq. 1c). The four resistances $R_1$-$R_4$ can be arranged as in the analog circuit 100 of FIGS. 7A to 10B.

In one aspect, the four TMR elements are programmed in such a way that the output voltage of a Wheatstone bridge composed by this four TMR elements (as described by FIG. 2A and Eq. 1f) is proportional to a cosine signal, i.e.:

$$\frac{R_2 \cdot R_3 - R_1 \cdot R_4}{[R_1 + R_2] \cdot [R_3 + R_4]} \sim \cos\theta, \qquad \text{Eq. 15}$$

where q is the orientation of the external magnetic field. In other words, the pseudo-cosine output response of the resistance of each TMR element $R_1$-$R_4$ is in such a way that Eq. 15 is fulfilled.

The analog circuit 100 further comprises an additional sub-circuit 103 including an op-amp 15 and a fifth resistance $R_5$ and a sixth resistance $R_6$. The fifth and sixth resistances can comprise TMR elements having a resistance that follows a pseudo-cosine response with respect to the orientation of the external magnetic field (described by Eq. 1c). The fifth resistance $R_5$ is connected to a terminal of the op-amp 15. The sixth resistance $R_6$ is connected between the terminal and an output of the op-amp 15, forming a positive feedback loop of the op-amp 15. An output of the first sub-circuit 101 is connected to the sixth resistance $R_6$ of the additional sub-circuit 103 and to an additional differential amplifier 31. The output of the additional sub-circuit 103 is connected to the additional differential amplifier 31.

In one aspect, the fifth resistance $R_5$ is equal to the first resistance $R_1$ ($R_5$=$R_1$) and the sixth resistance $R_6$ is equal to the sixth resistance $R_2$ ($R_6$=$R_2$). In this configuration, the analog circuit 100 has an output voltage response $V_{out-ac}$ of:

$$V_{out-ac} = \frac{(R_1 + R_2) \cdot (R_3 + R_4)}{R_2 \cdot R_3 - R_1 \cdot R_4} \cdot V_{in}. \qquad \text{Eq. 16a}$$

Equation 16a implies that the output voltage $V_{out-ac}$ of the analog circuit 100 is inversely proportional to the output voltage of a Wheatstone bridge configured with all four resistances $R_1$-$R_4$ (equation 1f). This implies that (with all four resistances $R_1$-$R_4$ being configured to fulfil equation 15) $V_{out-ac}$ is described as:

$$V_{out-ac} \sim \frac{1}{\cos\theta} \cdot V_{in}. \qquad \text{Eq. 16b}$$

In the configuration of FIG. 11A, the magnetic sensor device 10 comprises a sine magnetic sensor 11 with a sine output voltage $V_{SIN}$ that is electrically connected to the analog circuit 100 (to the non-inverting terminal of the op-amp 15 via the first TMR element $R_1$ of the first sub-circuit 101). The sine magnetic sensor 11 is biased by a bias voltage $V_{dd}$. An additional differential amplifier 31 is connected to the output of the first and additional sub-circuits 101, 103. Therefore, the output of the additional differential amplifier 31 corresponds to the output of the analog circuit 100 and therefore, it corresponds to the device output voltage $V_{out}$ of the magnetic sensor device 10 and is proportional to the tangent of the orientation of the magnetic field q.

FIG. 11B shows another configuration of the magnetic sensor device 10, where the output voltage of the analog circuit 100 $V_{out-ac}$ is electrically connected to the bias input of the sine magnetic sensor 11 through the output terminal of the additional differential amplifier 31 (the output of the additional differential amplifier 31 corresponds to the output of the analog circuit 100). The analog circuit 100 is biased by a bias voltage $V_{dd}$. Therefore, the output voltage of the sine magnetic sensor 11 corresponds to the device output voltage $V_{out}$ of the magnetic sensor device 10 and is proportional to the tangent of the orientation of the magnetic field q.

In the configuration of FIGS. 11a and 11b, the device output voltage $V_{out}$ of the magnetic sensor device 10 of FIGS. 11a and 11b follows a tangent output voltage $V_{TAN}$ such as described by equation 10d. Note also, that the sine magnetic sensor 11 further comprises amplifier buffers 30 at the output of each half-branch of the sine magnetic sensor 11 and a differential amplifier 31.

In the configuration of FIGS. 9a to 10b, the additional differential amplifier 31 can be configured to subtract the analog circuit voltage output $V_{out-ac}$ of the second sub-circuit 102 from the analog circuit voltage output $V_{out-ac}$ of the first sub-circuit 101. Similarly, in the configuration of FIGS. 11a and 11b, the additional differential amplifier 31 can be configured to subtract the analog circuit voltage output $V_{out-ac}$ of the second sub-circuit 103 from the analog circuit voltage output $V_{out-ac}$ of the first sub-circuit 101.

Figure 12A:
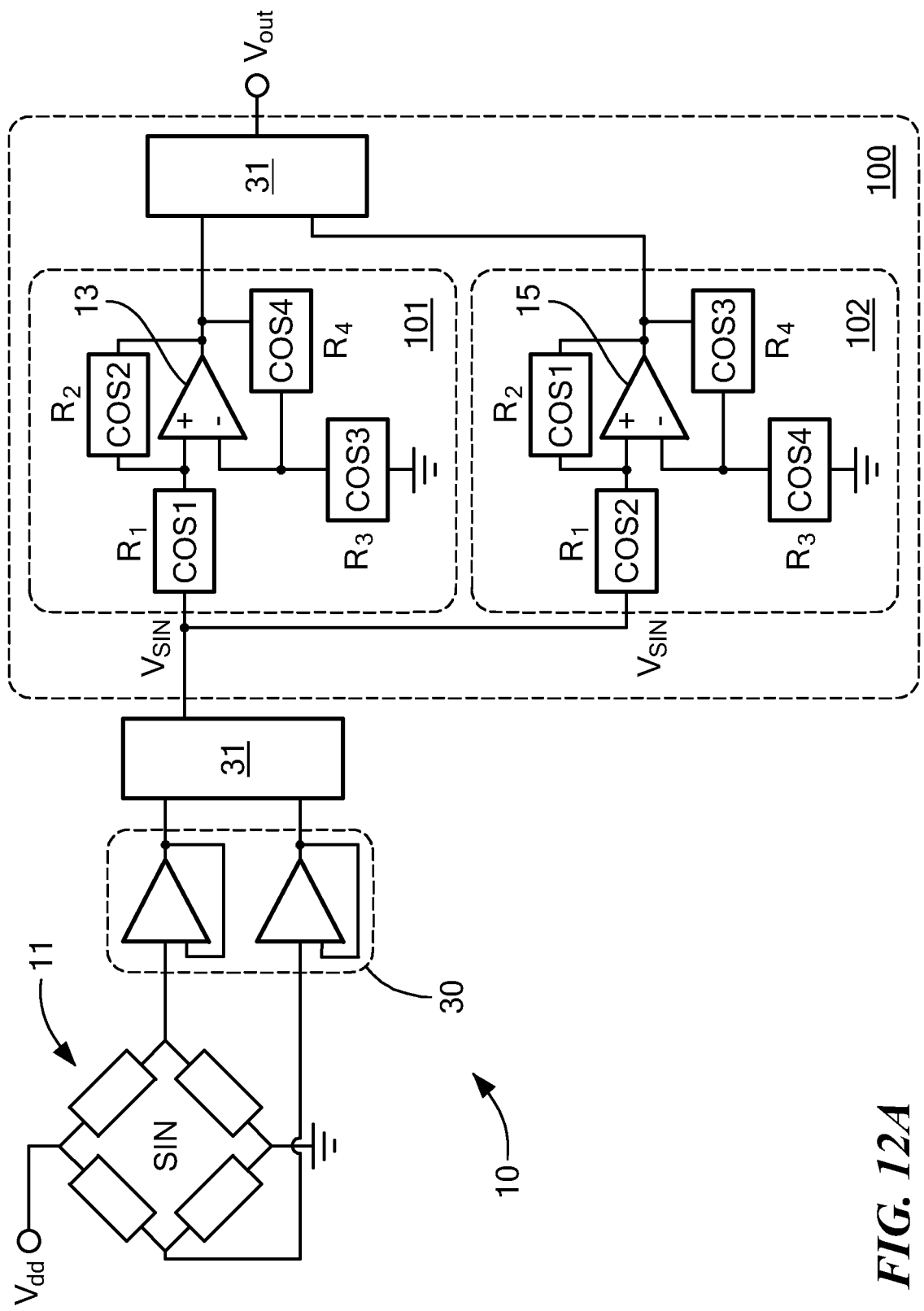
FIG. 12A shows the magnetic sensor device, according to yet another embodiment.
Figure 12B:
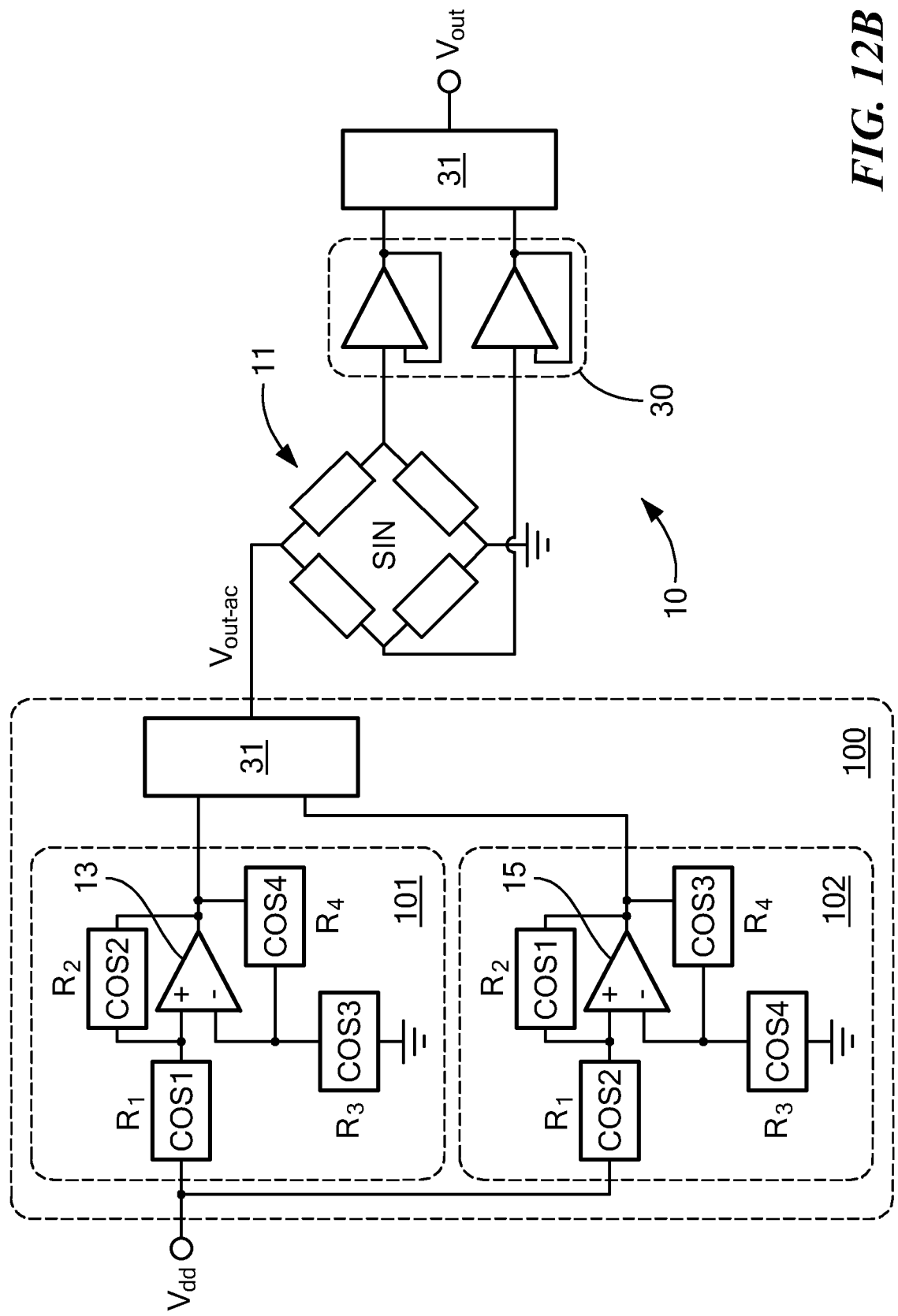
FIG. 12B shows a variant of the magnetic sensor device of FIG. 12A.

FIGS. 12A and 12B show an alternative configuration of the magnetic sensor device 10 of FIGS. 10A and 10B. In this embodiment, the magnetic sensor device 10 comprises an analog circuit 100 and a sine magnetic sensor 11. The analog circuit 100 comprises the first sub-circuit 101 including four resistances $R_1$, $R_2$, $R_3$, $R_4$ and the second sub-circuit 102 including four resistances $R_1$, $R_2$, $R_3$, $R_4$.

In an embodiment, the four resistances $R_1$-$R_4$ of each of the first and second sub-circuit 101, 102 can be TMR elements having a resistance that follows a pseudo-cosine response with respect to the orientation of the external magnetic field (described by Eq. 1c).

In an embodiment, the first TMR element resistance $R_1$ of the first sub-circuit 101 is equal to the second TMR element resistance $R_2$ of the second sub-circuit 102. The second TMR element resistance $R_2$ of the first sub-circuit 101 is equal to the first TMR element resistance $R_1$ of the second sub-circuit 102. The third TMR element resistance $R_3$ of the first sub-circuit 101 is equal to the fourth TMR element resistance $R_4$ of the second sub-circuit 102, and the fourth TMR element resistance $R_4$ of the first sub-circuit 101 is equal to the third TMR element resistance $R_3$ of the second sub-circuits 102.

In an embodiment, the four TMR elements $R_1$-$R_4$ of each of the first and second sub-circuits 101, 102 can be programmed in such a way that the output voltage of a Wheatstone bridge composed by the four TMR elements (as described by FIG. 2A and Eq. 1f) are proportional to a cosine signal (as described by equation 15). The output voltages $V_{out-ac1}$ and $V_{out-ac2}$ of the first and second sub-circuits 101, 102 can then be described as:

$$V_{out-ac101} = \frac{R_2 \cdot (R_3 + R_4)}{R_2 \cdot R_3 - R_1 \cdot R_4} \cdot V_{in}, \text{ and} \qquad \text{Eq. 17a}$$

$$V_{out-ac102} = -\frac{R_1 \cdot (R_3 + R_4)}{R_2 \cdot R_3 - R_1 \cdot R_4} \cdot V_{in}. \qquad \text{Eq. 17b}$$

The analog circuit 100 can further comprise an additional differential amplifier 31 connected to the output of the first and second sub-circuits 101, 102. The additional differential amplifier 31 can be configured to subtract the analog circuit voltage output $V_{out-ac}$ of the second sub-circuit 102 from the analog circuit voltage output $V_{out-ac}$ of the first sub-circuit 101, as described by equations 17a and 17b.

In the configuration of FIG. 12A, the output voltage of the sine magnetic sensor 11 is electrically connected to the first and second sub-circuits 101, 102 (to the non-inverting terminal of the op-amp 13 via the first resistance $R_1$ in the first sub-circuit 101, and the non-inverting terminal of the op-amp 15 via the first resistance $R_1$ in the second sub-circuit 102) of the analog circuit 100. The sine magnetic sensor 11 is biased by a bias voltage $V_{dd}$. The analog circuit 100 also comprises an additional differential amplifier 31 which is connected to the output of the first and second sub-circuits 101, 102. The output voltage of the additional differential amplifier 31 corresponds to the output voltage $V_{out-ac}$ of the analog circuit 100 and, therefore, generating the output voltage $V_{out}$ of the magnetic sensor device 10 described by equation 16a and therefore following a tangent response as described by equation 10f.

In the configuration of FIG. 12B, the output voltage $V_{out-ac}$ of the analog circuit 100 is electrically connected to the bias input of the sine magnetic sensor 11. The analog circuit 100 comprises an additional differential amplifier 31 that is connected to the output of the of the first and second sub-circuits 101, 102 (the output voltage of the additional differential amplifier 31 corresponds to the output voltage $V_{out-ac}$ of the analog circuit 100). The first and second sub-circuits 101, 102 are biased by a bias voltage $V_{dd}$. The output voltage of the sine magnetic sensor 11 generates the device output voltage $V_{out}$ of the magnetic sensor device 10 described by equation 16a and therefore following a tangent output voltage $V_{TAN}$ as described by equation 10f.

Note also, that the sine magnetic sensor 11 further comprises amplifier buffers 30 at the output of each half-branch of the sine magnetic sensor 11 and a differential amplifier 31.

Linearization of TAN Analog Signal

The device output voltage $V_{out}$ response of the magnetic sensor device 10 can be linearized in order to obtain a linear corrected output voltage $V_{corr}$ response.

The corrected output voltage $V_{corr}$ response can be expressed as:

$$V_{corr} = Sens \cdot \theta + C, \qquad \text{Eq. 18}$$

where Sens is the sensitivity and C is the offset of the corrected output voltage $V_{corr}$.

In an embodiment shown in FIG. 13A, a linear angular magnetic sensor device 400 (hereinafter called linear sensor device) comprises the magnetic sensor device 10 and a linearization integrated circuit (IC) 50 electrically connected to the device output voltage $V_{out}$ of the magnetic sensor device 10. An output terminal of the linearization IC 50 is the corrected output voltage $V_{corr}$ of the linear sensor device 400 showing a linear dependence with the orientation of the external magnetic field q. A similar embodiment but integrating an analog-digital converter 40 between the angular magnetic sensor device 10 and the linearization IC is shown in FIG. 13B. In both cases the magnetic sensor device 10 shows a tangent (or cotangent) device output voltage response with respect the orientation of the external magnetic field q. In FIG. 13B, the linearization IC 50 can comprise a LookUp Table (LUT).

Figure 13A:
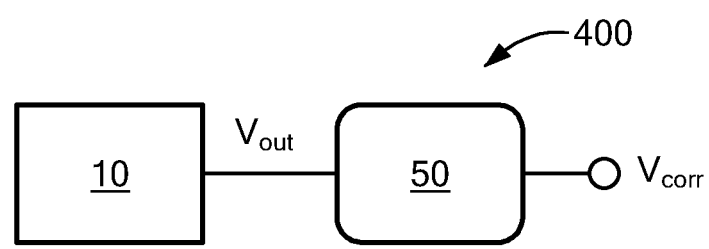
FIG. 13A represents a linear angular magnetic sensor device comprising the magnetic sensor device and a linearization integrated circuit (IC), according to an embodiment.
Figure 13B:
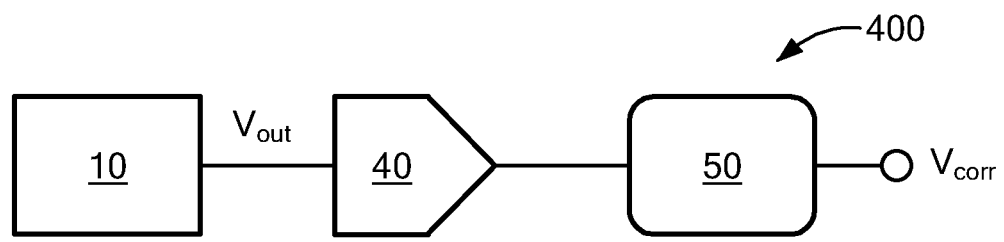
FIG. 13B shows the linear angular magnetic sensor device further comprising an analog-digital converter, according to an embodiment.

The configuration of FIG. 13A allows for small die size and high-speed response.

Different linearization schemes can be implemented: piecewise correction, tan h correction, and addition of the sine output voltage $V_{SIN}$ signal on tangent output voltage $V_{TAN}$ signal (or vice-versa).

For example, the linearization IC 50 can be configured to perform a Tan h correction scheme. Here, the linearization IC 50 can be configured to output a corrected output voltage $V_{corr}$ that is determined by equation 19:

$$V_{corr} \sim A \cdot \tanh(b \cdot V_{out}), \qquad \text{Eq. 19}$$

where A, and b are correction parameters that are independent of the external magnetic field. Linearization schemes applied on a magnetic sensor device have been described in international application PCT/IB2023/057421 be the present applicant.

Figure 14:
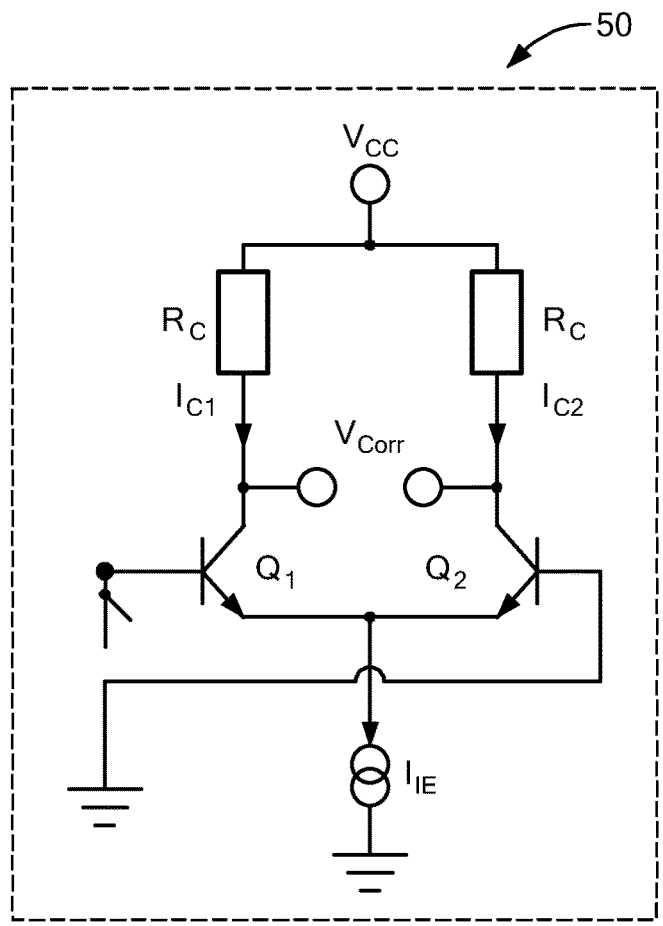
FIG. 14 shows an example of the linearization IC.

FIG. 14 shows an example of the linearization IC 50 configured to perform a Tan h correction scheme. The linearization IC 50 can be electrically connected to the device output voltage $V_{out}$ of the magnetic sensor device 10 according to the configuration of FIG. 3A. In the example of FIG. 14, the linearization IC 50 comprises an emitter-coupled pair differential amplifier.

Figure 15:
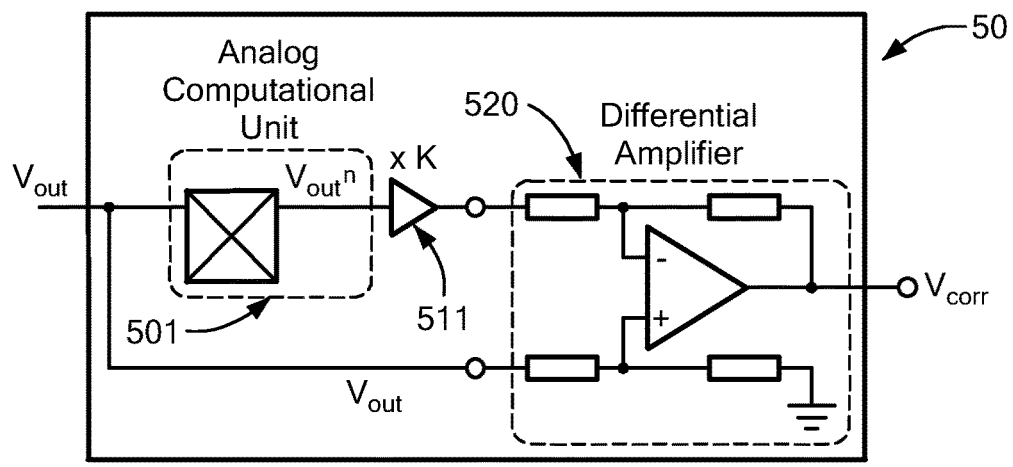
FIG. 15 shows the linearization IC, according to an embodiment.

In another embodiment described in FIG. 15, the linearization IC 50 can be configured to perform the following correction scheme:

$$V_{corr} \sim V_{out} - \sum_{i=1}^{n} K_i \cdot (V_{out})^{2i+1} \qquad \text{Eq. 20}$$

where $K_i$ are positive or negative coefficients independent of the external magnetic field.

In order to implement this correction scheme, at least an analog computational unit (ACU) 501 is required. The ACU 501 is an analog circuitry configured to provide an output voltage that corresponds to the input voltage $V_{in}$ to the power of n.

FIG. 15 shows a particular embodiment of this linearization IC 50. Here, the ACU 501 is configured to provide an output voltage $V_{out}^n$ that is the input voltage $V_{in}$ to the power of 3. Furthermore, a gain amplifier 511 connected at the output of the ACU 501 enables to obtain an additional voltage signal $V_{sub}$:

$$V_{sub} = K \cdot V_{out}^3. \qquad \text{Eq. 21}$$

A differential amplifier 520 is then used to subtract the additional voltage signal $V_{sub}$ from the input voltage $V_{in}$ of the analog linearization IC 50, leading to a correction output voltage $V_{corr}$:

$$V_{corr} \sim V_{out} - K \cdot V_{out}^3 \qquad \text{Eq. 22}$$

By fine tuning the value of coefficient K, the linear corrected output voltage $V_{corr}$ and proportional to the orientation of the external magnetic field is obtained.

Figure 16A:
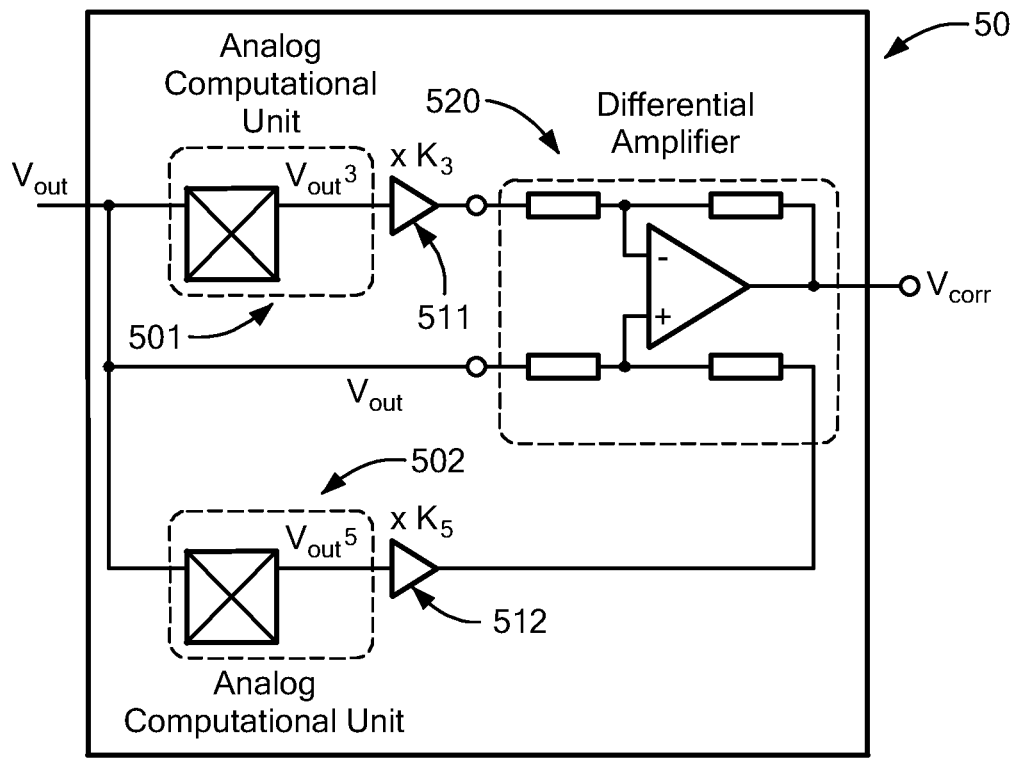
FIGS. 16A and 16B show the linearization IC, according to other embodiments.
Figure 16B:
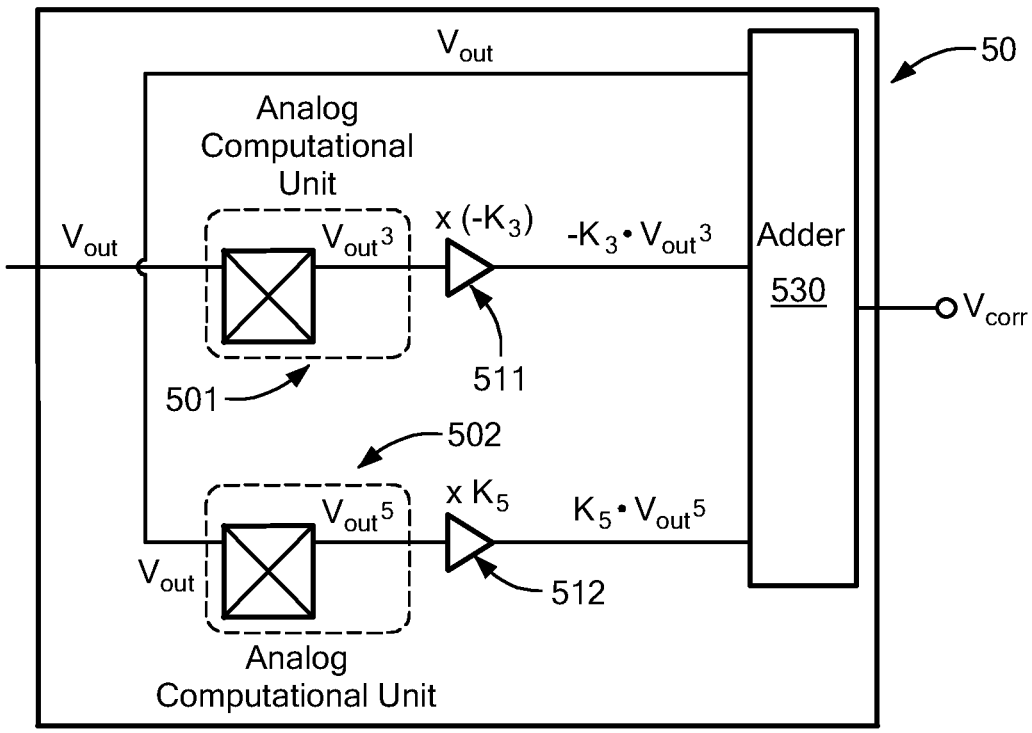

Other embodiments involving the correction of more than one high order components of $V_{out}$ can be obtained by considering more than one ACU. FIG. 16A and FIG. 16B show two different embodiments involving the correction of $3^{rd}$ and $5^{th}$ order components of $V_{out}$. For this, a first ACU 501 is configured to provide an output voltage that is the input voltage to the power of 3 and a second ACU 502 is configured to provide an output voltage that is the input voltage to the power of 5. More generally, the correction can be performed to the power n where n depends on the number of ACU 501, 502.

For the configuration of FIG. 16A, a first gain amplifier 511 is connected at the output of the first ACU 501 enabling to obtain a first additional voltage signal $V_{sub1}$:

$$V_{sub\_1} = K_1 \cdot V_{out}^3. \qquad \text{Eq. 23}$$

A second gain amplifier 512 is connected at the output of the second ACU 502 enabling to obtain a second additional voltage signal $V_{sub2}$:

$$V_{sub\_2} = K_2 \cdot V_{out}^5. \qquad \text{Eq. 24}$$

A differential amplifier 520 is then used to obtain a correction output voltage:

$$V_{corr} \sim V_{out} - K_1 \cdot V_{out}^3 + K_2 \cdot V_{out}^5. \qquad \text{Eq. 25}$$

By fine tuning the value of coefficients $K_1$ and $K_2$, a linear corrected output voltage $V_{corr}$ proportional to the orientation of the external magnetic field is obtained.

Similarly for the configuration of FIG. 16B, a first gain amplifier 511 and a second gain amplifier 512 are connected at the output of the first ACU 501 and at the output of the second ACU 502, respectively, enabling to obtain a first additional voltage signal $V_{sub1}$ and second additional voltage signal $V_{sub2}$, as defined in equations 23 and 24, respectively.

An adder or summing amplifier 530, configured to of sum the output voltage $V_{out}$ of the magnetic sensor device 10 and the output signals of the gain amplifier 511, can be used to obtain a correction output voltage following Eq. 25. The output signal of the adder 530 corresponds to the corrected output voltage $V_{corr}$ of the linear magnetic sensor device 400.

Figure 17A:
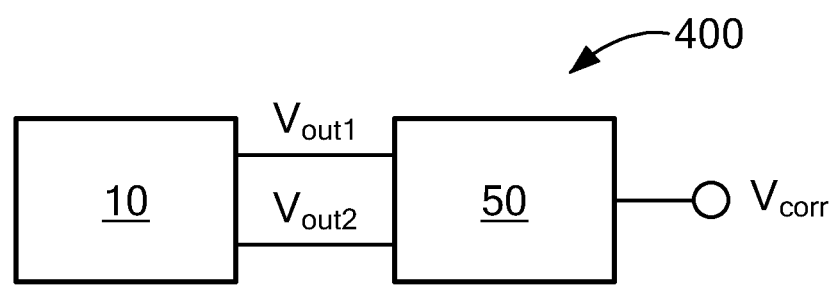
FIG. 17A illustrates a linear angular magnetic sensor device comprising the magnetic sensor device having a first and second output voltages, and comprising a linearization IC, according to an embodiment.
Figure 17B:
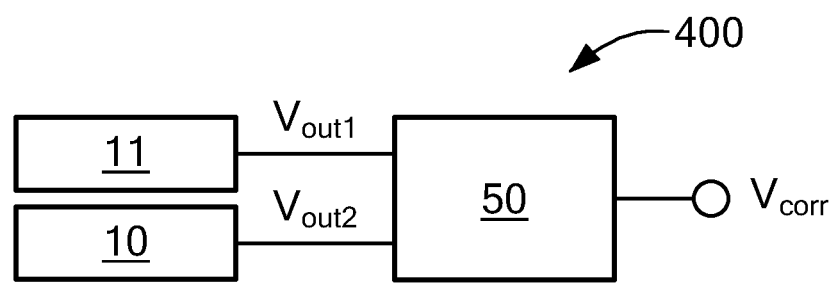
FIG. 17B illustrates a variant of the circuit of FIG. 17A.

In another embodiment described in FIG. 17A, a linear sensor device 400 comprises the magnetic sensor device 10 providing a first circuit output voltage $V_{out1}$ corresponding to an angular sinus response (as described by equation 19b below) and a second circuit output voltage $V_{out2}$ corresponding to an angular tangent response (as described by equation 19a below). The linearization IC 50 is electrically connected to the first and second circuit output voltages $V_{out1}$ and $V_{out2}$ of the magnetic sensor device 10. A similar embodiment but comprising an additional sine magnetic sensor 11 generating a sine output voltage $V_{SIN}$ is shown in FIG. 17B.

Figure 18:
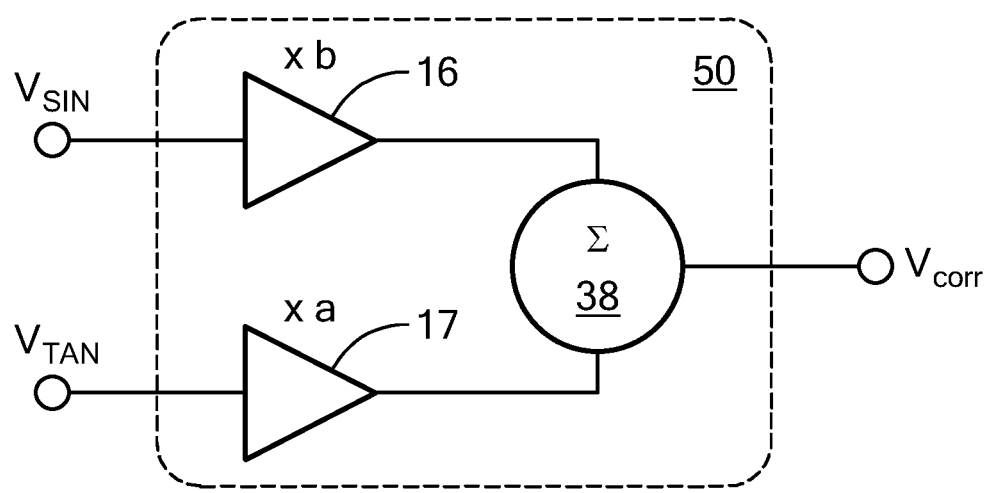
FIG. 18 shows the linearization IC of the FIG. 17A or 17B, according to an embodiment.

FIG. 18 illustrates a possible configuration of the linearization IC 50. The linearization IC 50 comprises a first amplifier 16 amplifying the second circuit output voltage $V_{out2}$ (equal to $V_{TAN}$) from the magnetic sensor device 10 by a factor "b", i.e., amplifying the output voltage of the SIN full bridge TMR-based magnetic sensor by a factor "b". A second amplifier 17 amplifies the first circuit output voltage $V_{out1}$ (equal to $V_{SIN}$) from the magnetic sensor device 10 by a factor "a". An adder or summing amplifier 38 is configured to add the output voltage of the first amplifier 16 and the output voltage of the second amplifier 17. The output terminal of the adder or summing amplifier 38 corresponds to the output terminal of the linearization IC 50. The output terminal of the linearization IC 50 corresponds to the corrected output voltage $V_{corr}$ of the linear sensor device 400:

$$V_{corr} = a \cdot V_{TAN} + b \cdot V_{SIN}. \qquad \text{Eq. 26}$$

For an external magnetic field having an orientation $\theta$ between $-45°$ and $45°$, the sine output voltage $V_{SIN}$ and the tangent output voltage $V_{TAN}$ can be described up to a 3rd order:

$$V_{SIN} = A \cdot \sin\theta \cdot V_{dd} \sim A \cdot \left(\theta - \frac{\theta^3}{6}\right) \cdot V_{dd}, \text{ and} \quad \text{Eq. 27a}$$

$$V_{TAN} = \tan\theta \cdot V_{dd} \sim \left(\theta + \frac{\theta^3}{3}\right) \cdot V_{dd}. \quad \text{Eq. 27b}$$

Thus, a corrected output voltage $V_{corr}$ corresponding to a linear response of the magnetic sensor device 10 with respect to the orientation θ of the external magnetic field 60 can be obtained by adding a signal proportional to the tangent output voltage $V_{TAN}$ to the sine output voltage $V_{SIN}$:

$$V_{corr} = V_{SIN} + c \cdot V_{TAN} \sim (A+c) \cdot \theta \cdot V_{dd} - \left(\frac{A}{6} - \frac{c}{3}\right) \cdot \theta^3 \cdot V_{dd}. \quad \text{Eq. 28a}$$

Therefore, if c=A/2:

$$V_{corr} \sim \left(\frac{3}{2}\right) \cdot A \cdot \theta \cdot V_{dd}. \quad \text{Eq. 28b}$$

Alternatively, a corrected output voltage $V_{corr}$ corresponding to a linear response of the magnetic sensor device 10 can be obtained by adding a signal proportional to the sine output voltage $V_{SIN}$ to tangent output voltage $V_{TAN}$:

$$V_{corr} = V_{TAN} + cc \cdot V_{SIN} \sim (1 + cc \cdot A) \cdot \theta \cdot V_{dd} + \left(\frac{1}{3} - \frac{cc \cdot A}{6}\right) \cdot \theta^3 \cdot V_{dd} \quad \text{Eq. 29a}$$

Therefore, if cc=2/A:

$$V_{corr} \sim 3 \cdot \theta \cdot V_{dd}. \quad \text{Eq. 29b}$$

In one aspect, the linear sensor device 400 can be further configured to minimize the temperature dependence of the corrected output voltage $V_{corr}$ by using a temperature coefficient of sensitivity (TCS) correction scheme.

Figure 19A:
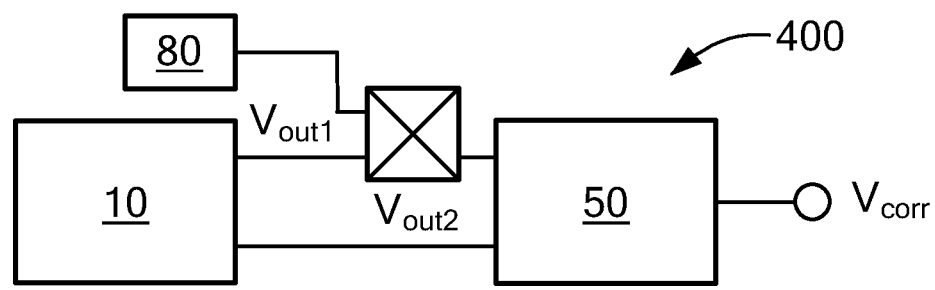
FIG. 19A illustrates the linear angular magnetic sensor device of FIG. 17A, comprising a PTAT circuit, according to an embodiment.

In an embodiment illustrated in FIG. 19A, the linear sensor device 400 comprises the magnetic sensor device 10 configured to provide a first circuit output voltage $V_{out1}$ corresponding to a first angular sinus response $V_{SIN}$ and a second circuit output voltage $V_{out2}$ corresponding to an angular tangent response $V_{TAN}$. The linear sensor device 400 further comprises a linearization IC 50, a proportional to absolute temperature (PTAT) circuit 80, and a multiplier 81. The PTAT circuit 80 is configured to generate a PTAT voltage. The multiplier 81 is inputted by the PTAT voltage and by the first circuit output voltage $V_{out1}$. The linearization IC 50 is inputted by the multiplier output voltage $V_{out-mul}$ of the multiplier 81 and the second circuit output voltage $V_{out2}$. The linearization IC 50 outputs a linear corrected output voltage $V_{corr}$ having a minimized temperature dependence. The linearization IC 50 can be configured as shown on FIG. 18

The multiplier 81 generates a correction parameter dependent on the temperature and adapted to cancel the TCS contribution of the sine output voltage $V_{SIN}$.

Figure 19B:
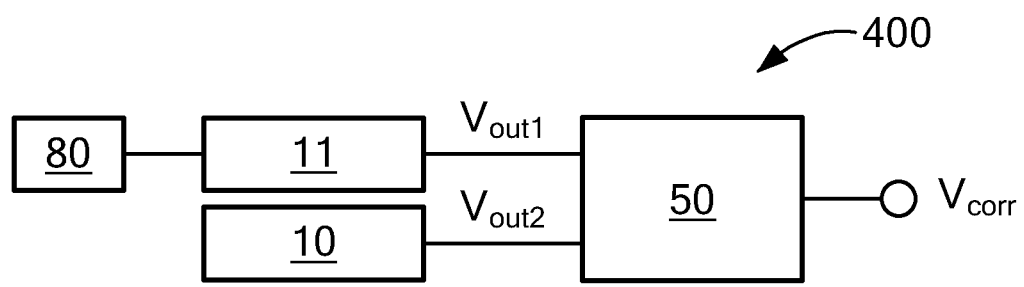
FIG. 19B illustrates a variant of the linear angular magnetic sensor device of FIG. 19A, according to an embodiment.

FIG. 19B illustrates a variant of the circuit of FIG. 19A, where a PTAT circuit 80 (acting as a voltage source) is used to bias an additional sine magnetic sensor 11 generating a sine output voltage $V_{SIN}$. The output voltage response of the linear sensor device 400 of FIG. 19B has a minimized temperature dependence enabling to obtain a linear corrected output voltage response $V_{corr}$ showing a minimized temperature dependence. Note that in this embodiment, no additional voltage multiplier is required.

The magnetic sensor device 10 described herein outputs an angular magnetic response following a tangent function with respect to the orientation of the external magnetic field. However, it should be noted that other configurations of the magnetic sensor device 10 can be considered for outputting an angular magnetic response following a cotangent function with respect to the orientation of the external magnetic field. For example, the TMR sinus or "pseudo-sinus" elements (full bridge, half-bridge and/or single element) can be permuted with a TMR cosine or "pseudo-cosine" element (full bridge, half-bridge and/or single element), or vice versa.

An advantage of the TMR element described herein is that its resistance can easily be tuned depending on the use of the magnetic sensor device 10. Consequently, the TMR element can have a wide range of resistances. Similarly, a wide range of bias voltage $V_{dd}$ can be applied to the magnetic sensor device 10 comprising the TMR element (the limit value of bias voltage $V_{dd}$ is the density current applied to each TMR element). More particularly, the resistance of the TMR element can be between 10Ω and 500 kΩ. The bias voltage $V_{dd}$ can be between 0.1 V and 100 V.

The correction parameter b (see for example equation 19) can be comprised between $0.1/(\sqrt{2} \times V_{dd})$ and $10/(\sqrt{2} \times V_{dd})$, where $V_{dd}$ is the applied bias voltage to the magnetic sensor device 10.

Factors a and b (see for example FIG. 18) can be approximated by the relationship: b~2×a/A, where A is the amplitude of output voltage of the sine magnetic sensor 11. More generally, the ratio of factor a to factor b (b/a) can be between 0.1×2/A and 10×2/A.

Having described exemplary embodiments of the disclosure, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

REFERENCE NUMBERS AND SYMBOLS

10 angular magnetic sensor device
11 sine magnetic sensor
11 a first half branch
12 cosine magnetic sensor
13 inverting operational amplifier
14 fully differential operational amplifier
15 operational amplifier

23

16 additional cosine magnetic sensor
100 analog circuit
101 first sub-circuit
102 second sub-circuit
103 additional sub-circuit
20 MTJ element
21 reference layer
210 reference magnetization
22 tunnel barrier layer
23 sense layer
230 sense magnetization
30 amplifier buffer, voltage follower
31 differential amplifier
32 analog signal multiplier
33 analog signal divider
40 analog-digital converter
400 linear sensor device
50 linearization integrated circuit (IC)
52 multiplier
53 non-inverting summing amplifier
60 external magnetic field
80 PTAT circuit
501 analog computational unit (ACU), first ACU
502 second ACU
511 gain amplifier, first gain amplifier
512 second gain amplifier
520 differential amplifier
38, 530 adder
φ orientation between sense layer and reference layer magnetization
θ orientation of external magnetic field
$R_1$ first resistance
$R_2$ second resistance
$R_3$ third resistance
$R_4$ fourth resistance
$R_5$ fifth resistance
$R_6$ sixth resistance
$V_1$ first multiplier input of the analog signal multiplier
$V_2$ second multiplier input of the analog signal multiplier
$V_{corr}$ corrected output voltage
$V_{corr, i}$ corrected output signal segment
$V_{dd}$ bias voltage
$V_{div}$ divider voltage
$V_{div1}$ first divider input
$V_{div2}$ second divider input
$V_{in}$, input voltage
$V_{in1}$ first input voltage
$V_{in2}$ second input voltage
$V_{out-div}$ divider output voltage
$V_{out-mul}$ multiplier output voltage
$V_{out}$ device output voltage, op-amp output voltage
$V_{out\_ac}$ analog circuit voltage output
$V_{out1}$ first circuit output voltage
$V_{out2}$ second circuit output voltage
$V_{COS}$ sensing output voltage, cosine output voltage
$V_{SIN}$ sensing output voltage, sine output voltage
$V_{sub}$ additional voltage signal
$V_{sub1}$ first additional voltage signal
$V_{sub2}$ second additional voltage signal
$V_{TAN}$ tangent output voltage

24

What is claimed is:

1. A two-dimensional analog angular magnetic sensor device for measuring an orientation of an external magnetic field, comprising:

at least a magnetic sensor, comprising a plurality of tunnel magnetoresistance (TMR) elements arranged in a full-bridge configuration and configured to provide a sine output voltage $V_{SIN}$:

$$V_{SIN} = A \cdot \sin\theta \cdot V_{dd},$$

or configured to provide a cosine output voltage $V_{COS}$:

$$V_{cos} = A \cdot \cos\theta \cdot V_{dd},$$

wherein A is parameter depending on the TMR ratio of the TMR element and $V_{dd}$ is a bias voltage inputted to the magnetic sensor;

wherein the magnetic sensor device further comprises an analog circuit configured to generates a circuit output voltage and electrically connected to the magnetic sensor such as that the magnetic sensor device generates a device output voltage $V_{out}$ that follows one of:

a tangent output voltage $V_{TAN}$:

$$V_{out} = K \cdot V_{dd} \cdot V_{TAN} = K \cdot V_{dd} \cdot \tan\theta,$$

a cotangent output voltage $V_{COTAN}$:

$$V_{out} = K \cdot V_{dd} \cdot V_{COTAN} = K \cdot V_{dd} \cdot \cotan\theta.$$

2. A linear sensor device comprising a magnetic sensor device comprising:

at least a magnetic sensor, comprising a plurality of TMR elements arranged in a full-bridge configuration and configured to provide a sine output voltage $V_{SIN}$:

$$V_{SIN} = A \cdot \sin\theta \cdot V_{dd},$$

configured to provide a cosine output voltage $V_{COS}$:

$$V_{COS} = A \cdot \cos\theta \cdot V_{dd},$$

wherein A is parameter depending on the TMR ratio of the TMR element and $V_{dd}$ is a bias voltage inputted to the magnetic sensor;

wherein the magnetic sensor device further comprises an analog circuit configured to generates a circuit output voltage and electrically connected to the magnetic sensor such as that the magnetic sensor device generates a device output voltage $V_{out}$ that follows one of:

a tangent output voltage $V_{TAN}$:

$$V_{out} = K \cdot V_{dd} \cdot V_{TAN} = K \cdot V_{dd} \cdot \tan\theta,$$

a cotangent output voltage $V_{COTAN}$:

$$V_{out} = K \cdot V_{dd} \cdot V_{COTAN} = K \cdot V_{dd} \cdot \cot\theta;$$

wherein the linear sensor device further comprises a linearization integrated circuit (IC) electrically connected to the device output voltage of the magnetic sensor device and outputting a corrected output voltage having a linear dependence with the orientation of the external magnetic field.

3. A two-dimensional analog angular magnetic sensor device for measuring an orientation of an external magnetic field, comprising:
at least a magnetic sensor, comprising a plurality of tunnel magnetoresistance (TMR) elements arranged in a full-bridge configuration and configured to provide a sine output voltage $V_{SIN}$ from a sine signal, a TMR ratio of the TMR elements, and a bias voltage, and a cosine output voltage $V_{COS}$ from a cosine signal, the TMR ratio and the bias voltage,
wherein the magnetic sensor device further comprises an analog circuit configured to generates a circuit output voltage and electrically connected to the magnetic sensor such as that the magnetic sensor device generates a device output voltage $V_{out}$ that comprises a tangent output voltage $V_{TAN}$ or a cotangent output voltage $V_{COTAN}$.

4. The magnetic sensor device according to claim 1,
wherein at least a magnetic sensor comprises a sine magnetic sensor configured to provide a sine output voltage and a cosine magnetic sensor configured to provide a sine output voltage.

5. The magnetic sensor device according to claim 1,
wherein said at least a magnetic sensor comprises a single sine magnetic sensor configured to provide a sine output voltage; and
wherein the analog circuit comprises at least a sub-circuit, each of said at least a sub-circuit including an op-amp and a first, second, third and fourth resistance;
wherein the first resistance connected to a non-inverting terminal of the op-amp, the second resistance is connected between a non-inverting terminal and an output of the op-amp, forming a positive feedback loop of the op-amp, the fourth resistance is connected between the inverting terminal and the output of the-amp, forming a negative feedback loop of the op-amp, the inverting terminal of the output of the-amp being further connected to ground via the third resistance;
wherein each of the first and second resistances or each of the third and fourth resistances comprises a TMR element having a resistance that follows a pseudo-cosine response with respect to the orientation of the external magnetic field; and
wherein said pseudo-cosine response $R(\varphi)$ is described by:

$$R(\varphi) = \frac{1}{G(\varphi)} = \frac{1}{G_0 + (\Delta G/2) \cdot \cos\varphi}$$

where G is the conductivity, $\Delta G$ is the change of conductivity, $G_0$ is the average conductivity between parallel and antiparallel configuration of the MTJ element, and $\varphi$ is the orientation of the external magnetic field.

6. The linear sensor device according to claim 2,
wherein the linearization IC is configured to perform a hyperbolic tangent linearization correction, described as:

$$V_{corr} = A \cdot \tanh(b \cdot V_{out}),$$

where A, and b are correction parameters that are independent of the external magnetic field, $V_{corr}$ is the corrected output voltage, and $V_{out}$ corresponds to the output voltage of the magnetic sensor device.

7. The linear sensor device according to claim 2,
wherein the linearization IC comprises at least one analog computational unit (ACU), said at least one ACU having an input voltage corresponding to the output voltage of the magnetic sensor device and being configured to provide an output voltage corresponding to the power of n;
wherein the output of each ACU is connected to a gain amplifier;
wherein the linear sensor device further comprise an adder configured to of sum the output voltage of the magnetic sensor device and the output signals of the gain amplifier; and
wherein the output signal of the adder corresponds to the corrected output voltage of the linear magnetic sensor device.

8. The linear sensor device according to claim 2,
the analog circuit comprises a first and second circuit output voltage; and
wherein the linearization IC is electrically connected to the first and second output voltages of the magnetic sensor device.

9. The magnetic sensor device according to claim 4,
wherein the analog circuit comprises an inverting op-amp, a first resistance and a second resistance, the analog circuit being inputted by the sine output voltage and the cosine output voltage through the first and second resistances, the sine and cosine output voltages being inputted to the inverting terminal of the inverting op-amp via the first and second resistances;
wherein
the bias voltage is inputted to the sine magnetic sensor and the circuit output voltage is inputted in the cosine magnetic sensor, such that the device output voltage follows a tangent output voltage;
or, wherein
the bias voltage is inputted to the cosine magnetic sensor and the circuit output voltage is inputted in the sine magnetic sensor, such that the device output voltage follows a cotangent output voltage.

10. The magnetic sensor device according to claim 4,
wherein the analog circuit comprises an inverting op-amp, a first resistance and a second resistance, the analog circuit being inputted by the sine output voltage and the cosine output voltage through the first and second resistances, the sine and cosine output voltages being inputted to the inverting terminal of the inverting op-amp via the first and second resistances;

wherein
the bias voltage is inputted to the sine magnetic sensor and the sine output voltage of the sine magnetic sensor is inputted to the non-inverting terminal of the op-amp via the first resistance, the circuit output voltage is inputted in the cosine magnetic sensor and the cosine output voltage of the cosine magnetic sensor is inputted to the inverting terminal of the op-amp via the second resistance, such that the device output voltage follows a tangent output voltage;
or, wherein
the bias voltage is inputted to the cosine magnetic sensor and the cosine output voltage of the cosine magnetic sensor is inputted to the non-inverting terminal of the op-amp via the second resistance, the circuit output voltage is inputted in the sine magnetic sensor and the sine output voltage of the sine magnetic sensor is inputted to the inverting terminal of the op-amp via the first resistance, such that the device output voltage follows a cotangent output voltage.

11. The magnetic sensor device according to claim 4, wherein the cosine magnetic sensor is connected in cascade with the sine magnetic sensor via the analog circuit comprising an analog signal divider generating a divider output voltage $V_{out\text{-}div}$:

$$V_{out-div} = k \cdot V_1/V_2,$$

wherein k is a constant, $V_1$ is an input voltage of a first divider input terminal of the analog signal divider, and $V_2$ is the input voltage on the second input terminal of the analog signal divider;
the cosine output voltage of the cosine magnetic sensor is electrically connected to the first divider input terminal, and the divider output voltage biases the sine magnetic sensor;
such that the device output voltage is described by:

$$V_{out} = k \cdot \frac{V_1}{V_{dd}} \cdot \tan\theta,$$

where the bias voltage $V_{dd}$ biases the cosine magnetic sensor.

12. The magnetic sensor device according to claim 4, further comprising an additional cosine magnetic sensor configured to provide a cosine output voltage;
wherein the analog circuit includes a fully differential op-amp having a first and second input voltage and having a first and second circuit output voltage, the analog circuit further including a first, second, third and fourth resistance;
wherein the full bridge circuit arrangement of the sine magnetic sensor comprises a first half branch inputted to the first input voltage via the first resistance, and a second half branch inputted to the second input terminal via the second resistance;
wherein the first circuit output voltage biases the cosine magnetic sensor, and the second circuit output voltage biases the additional cosine magnetic sensor;
wherein the output of the cosine magnetic sensor is electrically connected to the first input voltage via the third resistance, and wherein the output of the additional cosine magnetic sensor is electrically connected to the second input terminal via the fourth resistance; and
wherein the difference between the first and second circuit output voltages corresponds to the device output voltage of the magnetic sensor and wherein the device output voltage is proportional to the tangent of the orientation of the external magnetic field:

$$V_{out} = K \cdot V_{dd} \cdot \tan\theta;$$

wherein the bias voltage biases the sine full-bridge magnetic sensor.

13. The magnetic sensor device according to claim 5,
wherein said at least a sub-circuit comprises a first sub-circuit; and
wherein said op-amp comprises a non-inverting op-amp.

14. The magnetic sensor device according to claim 5,
wherein said at least a sub-circuit comprises a first sub-circuit and a second sub-circuit;
wherein the first sub-circuit comprises an inverting op-amp and the second sub-circuit comprises op-amp a non-inverting op-amp;
wherein the analog circuit further comprises an additional differential amplifier; and
wherein a first input voltage of the differential amplifier is electrically connected to a first circuit output voltage of the first sub-circuit and a second input terminal of the differential amplifier is electrically connected to a second circuit output voltage of the second sub-circuit.

15. The magnetic sensor device according to claim 5,
wherein said at least a sub-circuit comprises a first sub-circuit wherein said op-amp comprises an inverting op-amp;
wherein the analog circuit further comprises an additional sub-circuit;
the additional sub-circuit including a non-inverting op-amp, a fifth resistance and a sixth resistance, the fifth resistance being connected to a non-inverting terminal of the op-amp, the sixth resistance being connected between the terminal and an output of the op-amp, forming a positive feedback loop of the op-amp;
wherein each of the resistances comprises a TMR element having a resistance that follows a pseudo-cosine response with respect to the orientation of the external magnetic field.

16. The linear sensor device according to claim 8,
wherein the linearization IC comprises a first amplifier amplifying the second circuit output voltage, a second amplifier amplifying the first circuit output voltage, an adder configured to add the output voltage of the first amplifier and the output voltage of the second amplifier;
wherein the output terminal of the analog linearization IC corresponds to the output terminal of the linear angular magnetic sensor device outputting a corrected output voltage $V_{corr}$:

$$V_{corr} = a \cdot V_{TAN} + b \cdot V_{SIN}.$$

17. The linear sensor device according to claim 8,
further comprising a PTAT circuit configured to generate a PTAT voltage, and a multiplier inputted by the PTAT voltage and by the first circuit output voltage; and
wherein the linearization IC is inputted by the multiplier output voltage of the multiplier and the second circuit output voltage.

18. The magnetic sensor device according to claim 13,
wherein each of the third and fourth resistances comprises a TMR element having a resistance that follows a pseudo-cosine response with respect to the orientation of the external magnetic field;
wherein the sine output voltage is electrically connected to the non-inverting terminal of the op-amp via the first resistance;
wherein the sine magnetic sensor is biased by a bias voltage; and
wherein the circuit output voltage of the analog circuit corresponds to the device output voltage.

19. The magnetic sensor device according to claim 13,
wherein each of the third and fourth resistances comprises a TMR element having a resistance that follows a pseudo-cosine response with respect to the orientation of the external magnetic field;
wherein the circuit output voltage of the analog circuit is inputted in the bias input of the sine magnetic sensor;
wherein the analog circuit is biased by the bias voltage; and
wherein the output voltage of the sine full-bridge magnetic sensor corresponds to the device output voltage.

20. The magnetic sensor device according to claim 13,
wherein each of the first and second resistances comprises a TMR element having a resistance that follows a pseudo-cosine response with respect to the orientation of the external magnetic field;
wherein the sine output voltage of the sine magnetic sensor, biased by the bias voltage, is electrically connected to the analog circuit by being connected to the non-inverting terminal of the op-amp via the first resistance; and
wherein the analog circuit further comprises an additional differential amplifier electrically connected to the circuit output voltage of the analog circuit and to the output of the sine magnetic sensor; and
wherein the output voltage of the additional differential amplifier corresponds to the device output voltage of the magnetic sensor device.

21. The magnetic sensor device according to claim 13,
wherein each of the first and second resistances comprises a TMR element having a resistance that follows a pseudo-cosine response with respect to the orientation of the external magnetic field;
wherein the analog circuit is biased by the bias voltage and further comprises an additional differential amplifier electrically connected to the circuit output voltage of the analog circuit and to the bias input of the sine magnetic sensor; and
wherein the output voltage of the sine magnetic sensor corresponds to the device output voltage of the magnetic sensor device.

22. The magnetic sensor device according to claim 14,
wherein each of the third and fourth resistances comprises a TMR element having a resistance that follows a pseudo-cosine response with respect to the orientation of the external magnetic field; and
wherein the pseudo-cosine response of the each of the third and fourth resistances of the sub-circuit is opposite to the pseudo-cosine response of the third and fourth resistances of the second sub-circuit.

23. The magnetic sensor device according to claim 14,
wherein each of the first and second resistances comprises a TMR element having a resistance that follows a pseudo-cosine response with respect to the orientation of the external magnetic field; and
wherein the pseudo-cosine response of the third and fourth resistances of the first sub-circuit is opposite to the pseudo-cosine response of the first and second resistances of the second sub-circuit.

24. The magnetic sensor device according to claim 14,
wherein the four resistances of each sub-circuit comprise a TMR element having a resistance that follows a pseudo-cosine response with respect to the orientation of the external magnetic field.

25. The magnetic sensor device according to claim 15,
wherein the sine magnetic sensor is biased by a bias voltage and its sine output voltage is electrically connected to the analog circuit; and
wherein an additional differential amplifier is connected to the output of the first and additional sub-circuits, such that the output voltage of the additional differential amplifier corresponds to the device output voltage of the magnetic sensor device.

26. The magnetic sensor device according to claim 15,
wherein the analog circuit is biased by a bias voltage;
wherein the circuit output voltage of the analog circuits is electrically connected to the sine magnetic sensor; and
wherein the output voltage of the sine magnetic sensor corresponds to the device output voltage of the magnetic sensor device.

27. The linear sensor device according to claim 17,
further comprising an additional sine magnetic sensor generating a sine output voltage;
wherein the PTAT circuit bias the additional sine magnetic sensor.

28. The magnetic sensor device according to claim 22,
wherein the sine magnetic sensor is biased by a bias voltage and its sine output voltage is electrically connected to the first and second sub-circuits; and
wherein the additional differential amplifier is connected to the first and second output voltages of the first and second sub-circuits, such that the output voltage of the additional differential amplifier corresponds to the device output voltage of the magnetic sensor device.

29. The magnetic sensor device according to claim 22,
wherein the first and second sub-circuits are biased by a bias voltage;
wherein the first and second circuit output voltages of the first and second sub-circuits are electrically connected to the additional differential amplifier and to the bias input of the sine magnetic sensor; and
wherein the output voltage of the sine magnetic sensor corresponds to the device output voltage of the magnetic sensor device.

* * * * *